US010043527B1

(12) United States Patent
Gurijala et al.

(10) Patent No.: US 10,043,527 B1
(45) Date of Patent: Aug. 7, 2018

(54) HUMAN AUDITORY SYSTEM MODELING WITH MASKING ENERGY ADAPTATION

(71) Applicant: Digimarc Corporation, Beaverton, OR (US)

(72) Inventors: Aparna R. Gurijala, Beaverton, OR (US); Shankar Thagadur Shivappa, Tualatin, OR (US); Ravi K. Sharma, Portland, OR (US); Brett A. Bradley, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

(21) Appl. No.: 15/213,335

(22) Filed: Jul. 18, 2016

Related U.S. Application Data

(60) Provisional application No. 62/194,185, filed on Jul. 17, 2015.

(51) Int. Cl.

| | |
|---|---|
| ***G10L 19/025*** | (2013.01) |
| ***G01L 19/02*** | (2006.01) |
| ***G10L 19/018*** | (2013.01) |
| ***G10L 19/26*** | (2013.01) |
| ***G10L 21/007*** | (2013.01) |
| ***G10L 21/0208*** | (2013.01) |
| ***G10L 19/02*** | (2013.01) |

(52) U.S. Cl.
CPC .......... *G10L 19/025* (2013.01); *G10L 19/018* (2013.01); *G10L 19/0212* (2013.01); *G10L 19/26* (2013.01); *G10L 21/007* (2013.01); *G10L 21/0208* (2013.01)

(58) Field of Classification Search
CPC ..... G10L 19/02; G10L 19/0204; G10L 19/26; G10L 21/007; G10L 21/0208; H04B 1/665
See application file for complete search history.

(56) References Cited

U.S. PATENT DOCUMENTS 5,040,217 A 8/1991 Brandenburg et al.
5,079,648 A 1/1992 Maufe
5,319,735 A 6/1994 Preuss et al.
(Continued)

FOREIGN PATENT DOCUMENTS

WO WO2001006755 1/2001
WO WO2015100430 7/2015

OTHER PUBLICATIONS

U.S. Appl. No. 15/145,784, filed May 3, 2016.
(Continued)

*Primary Examiner* — Matthew H Baker
(74) *Attorney, Agent, or Firm* — Digimarc Corporation

(57) ABSTRACT

A method for generating a psychoacoustic model from an audio signal transforms a block of samples of an audio signal into a frequency spectrum comprising frequency components. From this frequency spectrum, it derives group masking energies. These group masking energies each correspond to a group of neighboring frequency components in the frequency spectrum. For a group of frequency components, the method allocates the group masking energy to the frequency components in the group in proportion to energy of the frequency components within the group to provide adapted mask energies for the frequency components within the group, the adapted mask energies providing masking thresholds for the psychoacoustic model of the audio signal.

12 Claims, 7 Drawing Sheets

(56) References Cited

U.S. PATENT DOCUMENTS

| | | | | |
|---|---|---|---|---|
| 5,632,003 | A * | 5/1997 | Davidson | H04B 1/665 704/200.1 |
| 5,937,000 | A | 8/1999 | Lee et al. | |
| 5,956,674 | A * | 9/1999 | Smyth | G10L 19/0208 704/200.1 |
| 6,061,793 | A | 5/2000 | Tewfik et al. | |
| 6,308,150 | B1 * | 10/2001 | Neo | G10L 19/002 704/200.1 |
| 6,320,965 | B1 | 11/2001 | Levine | |
| 6,571,144 | B1 | 5/2003 | Moses et al. | |
| 6,674,876 | B1 | 1/2004 | Hannigan et al. | |
| 7,263,203 | B2 | 8/2007 | Rhoads et al. | |
| 7,454,327 | B1 | 11/2008 | Neubauer et al. | |
| 8,483,426 | B2 | 7/2013 | Rhoads et al. | |
| 8,589,155 | B2 * | 11/2013 | Zavarehei | G10L 19/032 704/200.1 |
| 2001/0029580 | A1 | 10/2001 | Moskowitz | |
| 2004/0024588 | A1 | 2/2004 | Watson | |
| 2004/0184369 | A1 | 9/2004 | Herre et al. | |
| 2006/0002583 | A1 | 1/2006 | Reed et al. | |
| 2006/0004566 | A1 * | 1/2006 | Oh | G10L 19/0017 704/200.1 |
| 2006/0053018 | A1 * | 3/2006 | Engdegard | G10L 19/008 704/500 |
| 2008/0215333 | A1 * | 9/2008 | Tewfik | G10L 19/018 704/273 |
| 2010/0322469 | A1 | 12/2010 | Sharma | |
| 2011/0038490 | A1 * | 2/2011 | Yang | H03G 5/165 381/103 |
| 2011/0137643 | A1 * | 6/2011 | Yamanashi | G10L 19/0204 704/203 |
| 2012/0214515 | A1 | 8/2012 | Davis et al. | |
| 2013/0024201 | A1 * | 1/2013 | Zavarehei | H04B 1/665 704/500 |
| 2013/0218314 | A1 * | 8/2013 | Wabnik | G10L 19/018 700/94 |
| 2014/0108020 | A1 | 4/2014 | Sharma et al. | |
| 2014/0142958 | A1 | 5/2014 | Sharma et al. | |
| 2015/0016661 | A1 | 1/2015 | Lord | |
| 2016/0189723 | A1 * | 6/2016 | Davis | G10L 19/008 704/501 |
| 2016/0293172 | A1 | 10/2016 | Sharma et al. | |
| 2016/0378427 | A1 | 12/2016 | Sharma et al. | |
| 2017/0133022 | A1 | 5/2017 | Gurijala et al. | |

OTHER PUBLICATIONS

N. Jayant, J. Johnston, and R. Safranek, Signal Compression Based on Method of Human Perception, Proceedings of IEEE, vol. 81, No. 10, pp. 1385-1422, Oct. 1993.

K. Egger, Perception and Neural Representation of Suprathreshold Signals in the Presence of Complex Maskers, Diploma Thesis, Graz University of Technology, 2012.

B.C.J. Moore, An Introduction to the Psychology of Hearing, Emerald Group Publishing Limited, Fifth Edition, 2004, pp. 66-85.

M. Bosi and R.E. Goldberg, Introduction to Digital Audio Coding and Standards. Kluwer Academic, 2003, pp. 180-191.

M. Bosi and R.E. Goldberg, Introduction to Digital Audio Coding and Standards. Kluwer Academic, 2003, pp. 116-121.

* cited by examiner

HUMAN AUDITORY SYSTEM MODELING WITH MASKING ENERGY ADAPTATION

RELATED APPLICATION DATA

This application claims the benefit of U.S. Provisional Application No. 62/194,185, filed Jul. 17, 2015.

TECHNICAL FIELD

The invention relates to audio signal processing and specifically automated application of psychoacoustic modeling for signal processing applications.

BACKGROUND AND SUMMARY

Psychoacoustic modeling is a heavily researched field of signal processing for machine modeling of the human auditory system. The human ear transforms sound pressure waves traveling through air into nerve pulses sent to the brain, where the sound is perceived. While one individual's ability to perceive sounds and differences between sounds differs from one person to the next, researchers in the field of psychoacoustics have developed generalized models of the human auditory system (HAS) through extensive listening tests. These tests produce audibility measurements, which in turn, have led to the construction of perceptual models that estimate a typical human listener's ability to perceive sounds and difference between sounds.

These models derived from human listening tests, in turn, are adapted for use in automated signal processing methods in which a programmed processor or signal processing circuit estimates audibility from audio signals. This audibility is specified in terms of sound quantities like sound pressure, energy or intensity, or a ratio of such quantities to a reference level (e.g., decibels (dB)), at frequencies and at time interval. A common way of representing in a machine the limits of what a human can hear is a hearing threshold indicating a level under which a particular sound is estimated by the machine to be imperceptible to humans. The threshold is often relative to a particular signal level, such as level at which a sound is imperceptible relative to another sound. The threshold need not be relative to a reference signal, but instead, may simply provide a threshold level, e.g., an energy level, indicating the level below which, sounds are predicted to not be perceptible by a human listener.

The intensity range of human hearing is quite large. The human ear can detect pressure changes from as small as a few micropascals to greater than 1 bar. As such, sound pressure level is often measured logarithmically, with pressures referenced to 20μ Pascals (Pa). The lower limit of audibility is defined as 0 dB. The following logarithmic unit of sound intensity ratios is commonly used in psychoacoustics:

$$SPL = 10\log_{10}\frac{I}{I_{ref}} = 20\log_{10}\frac{p}{p_{ref}}$$

Here, p is the sound pressure and $p_{ref}$ is the reference sound pressure usually selected to be 20 μPa, which is roughly equal to the sound pressure at the threshold of hearing for frequencies around 4 kHz. The variable I is the sound intensity, and it is usually taken to be the square of the magnitude at that frequency component. In order to compute the SPL, the exact playback level of the audio signal should be known. This is usually not the case in practice. Hence, it is assumed that the smallest signal intensity that can be represented by the audio system (e.g., least significant bit or LSB of a digitized or quantized audio signal) corresponds to an SPL of 0 dB in the hearing threshold or threshold in quiet. A 0 dB SPL is found in the vicinity of 4 kHz in the threshold of hearing curve. Implementations of psychoacoustic models sometimes convert audio signal intensity to SPL, but need not do so. Where necessary, audio signal intensity may be converted to the SPL for processing in the SPL domain, and the result may then be converted back to intensity.

In some applications of psychoacoustic modeling, the absolute threshold of hearing is also used to predict audibility of a sound. The minimum threshold at which a sound can be heard is frequency dependent and is expressed as an absolute threshold of hearing (ATH) curve of thresholds varying with frequency. Automated psychoacoustic modeling applies this minimum threshold curve by assuming that any sound measured to be below it is inaudible. However, such automated application of ATH sometimes involves assumptions on the volume levels used for playback. If these assumptions do not hold, there is a risk that the distortions made to an audio signal in a digital signal processing operation based on the assumptions will cause unwanted audible artifacts.

Frequency scales derived from listening experiments are approximately logarithmic in frequency at the high frequencies and approximately linear at the low end. The frequency range of human hearing is about 20 to 20 kHz. The variation of the scale over frequency is intended to correspond approximately to the way in which the ear perceives differences among sounds at neighboring frequencies. A couple of examples of these scales are the mel scale and the Bark scale. The underlying theory for these frequency scales used in psychoacoustics originated, in part, with Fletcher's study of critical bands of the human ear. A critical bandwidth refers to the frequency bandwidth of an "auditory filter" created by the cochlea, the sense organ within the inner ear. Generally speaking, the critical band is comprised of the group of neighboring frequencies (a "band") within which a second tone will interfere with the perception of a first tone by auditory masking. The auditory filters are an array of overlapping bandpass filters that model the sensitivity of different points along the basilar membrane to frequency ranges.

Another concept associated with the auditory filter is the equivalent rectangular bandwidth (ERB). The ERB is a way of expressing the relationship between the auditory filter, frequency, and the critical bandwidth. According to Moore (please see, B. C. J. Moore, An Introduction to the Psychology of Hearing, Emerald Group Publishing Limited, Fifth Edition, 2004, pp. 69, 73-74), the more recent measurements of critical bandwidths are referred to as ERB to distinguish them from the older critical bandwidth measurements which were obtained on the basis of the assumption that auditory filters are rectangular. An ERB passes the same amount of energy as the auditory filter it corresponds to and shows how it changes with input frequency.

A significant aspect of HAS modeling, in particular, is modeling masking effects. Masking effects refer to the phenomena of psychoacoustics in which an otherwise audible sound is masked by another sound. Temporal masking refers to a sound masking sounds that occur before or after it in time. Simultaneous masking refers to sounds that mask sounds occurring approximately together in frequency, based on rationale similar to critical bands and subsequent research. It is often modeled through frequency domain analysis where sound types, such as a tone or noise-like sound, mask another tone or noise like sound.

Within this document, we refer to sounds that mask other sounds as "maskers," and sounds that are masked by other sounds as "maskees." Most real world audio signals are complex sounds, meaning that they are composed of multiple maskers and multiple maskees. Within these complex sounds, many of the maskees are above the masking threshold Despite extensive research and application of HAS models, masking phenomenon of complex sounds is still poorly understood. In ongoing research, there is controversy in the interpretation of masking even for the simplest case of several individually spaced sinusoids in the presence of background noise. Even for this case, there is a lack of clarity as to whether or not the presence of multiple maskers within a local frequency neighborhood not exceeding the critical bandwidth, or the ERB, will increase the masking threshold due to a cumulative effect or does not noticeably alter it. For additional information, please see, B. C. J. Moore, An Introduction to the Psychology of Hearing, Emerald Group Publishing Limited, Fifth Edition, 2004, pp. 78-83. Recent research has demonstrated the role of several perceptual attributes of maskers in influencing the nature of masking. Some of these attributes include saliency of masker, nature of masker intensity fluctuations across frequency, inter-aural disparities, and so on as described in K. Egger, Perception and Neural Representation of Suprathreshold Signals in the Presence of Complex Maskers, Diploma Thesis, Graz University of Technology, 2012. Inadequate understanding of the masking phenomenon of complex signals is a key reason for the discrepancy behind the actual expert-level ("golden ears") perception of masking and the masking thresholds obtained by state-of-art psychoacoustic models.

Masking is generally applied using a warped frequency scale such as the bark scale or the ERB scale, both of which correspond better to the frequency processing inherent in the human auditory system compared to the linear frequency scale. The state-of-art audio perceptual models approximate the masking of complex sounds by either decimating (eliminating less dominant) maskers occurring within a local frequency neighborhood or by partitioning the frequency space and pooling (usually additively) the signal energy within a partition to create a single masker per partition. Both of these approaches lead to a coarse representation of the final mask due to a reduction in the frequency resolution of the mask generation process. The loss in frequency resolution often manifests itself as roughness in the sound perception.

One aspect of the invention is a method for generating a psychoacoustic model from an audio signal. In this method, the masking energy derived for a group of frequency components is allocated to components within the group in a process referred to as "Energy Adaptation." In this method, a block of samples of an audio signal is transformed into a frequency spectrum comprising frequency components. From the frequency spectrum, the method derives group masking energies. The group masking energies each correspond to a group of neighboring frequency components in the frequency spectrum. For each of plural groups of neighboring frequency components, the method allocates the group masking energy to the frequency components in a corresponding group in proportion to energy of the frequency components within the corresponding group. The output of this process is comprised of adapted mask energies for the frequency components within each group. These adapted mask energies provide masking thresholds for the psychoacoustic model of the audio signal.

The allocation of masking energy within a group is preferably adapted according to an analysis of the distribution of energy of the frequency components in the group. Allocations of masking energy are adapted based on the extent to which frequency components are highly varying (e.g., spiky). For example, one implementation assesses the distribution by determining the variance and a group average of the energies of the frequency components within a group. In a group where variance exceeds a threshold, this method compares the adapted mask energies of frequency components with group average. For frequency components in the group with adapted mask energy that exceeds the group average, the method sets the group average as a masking threshold for the frequency component.

There are a variety of applications where this energy adaptation provides improved performance. Generally speaking, the method provides an effective means for machine estimation of audibility of audio signals and audio signal processing operations on an input audio signal. These audibility assessments, in particular, provide for improved audio compression and improved digital watermarking, in which auxiliary digital data is encoded using the model to achieve desired robustness and perceptual quality constraints. In these applications, the adapted masking thresholds for frequency components are applied to control audibility of changes in an audio signal.

Further features and advantages will become apparent from the following detailed description and accompanying drawings.

DETAILED DESCRIPTION

Figure 1:
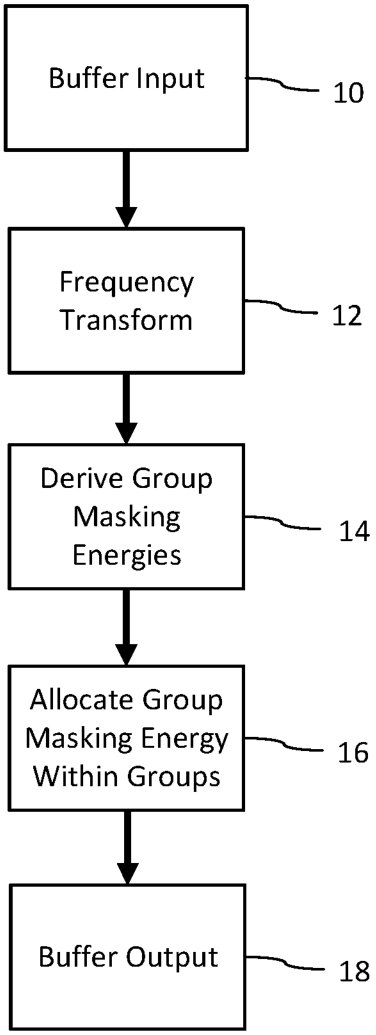
FIG. 1 is a diagram illustrating a method of allocating group masking energy to frequency components within groups of frequency coefficients in the spectrum of an audio signal.

FIG. 1 is a diagram illustrating a method of allocating group masking energy. The method operates on an incoming audio stream, which is sub-divided into blocks. The blocks are buffered (10), processed to generate a masking model for a block (102-106), and the model and audio signal is buffered again for the next stage of audio processing. For real time or near time operation, the generation of the model is implemented to minimize latency of model generation and application. As is common in digital signal processing, the audio stream is digitized into samples at a particular sampling rate and bits/sample according to the level of quantization applied (e.g., 8, 16, 24, etc. bits per sample). Because the frequency range of human hearing is about 20 to 20 kHz, typical sampling rates are at or above the Nyquist rate (e.g., 44.1 kHz, 48 kHz or higher for more recent audio formats). One implementation, for example, operates on block size of 1024 samples at a sampling rate of 48 kHz. The approach is readily applicable to different block sizes, sample rates and bit depths per sample.

The energy adaptation method begins by computing the spectrum of a block of samples in the buffer. This is depicted in FIG. 1 as a frequency transform (12) of the input audio signal. The process of converting the audio signal into its spectrum is preceded by application of a window function on the current sample block, which overlaps the previous block in the stream by some amount (e.g., around ½ of the block length in samples). The spectrum is generated using a filter bank or frequency domain transform module, such as an FFT.

In our embodiments, a discrete Fourier transform (DFT) is utilized for simultaneous mask computation in both audio compression and digital watermarking. In our digital watermarking embodiment, a DFT is used during the watermark embedding process. In audio coding, either a filter bank such as Pseudo Quadrature Mirror Filter (PQMF) or a transform such as Modified Discrete Cosine Transform (MDCT) is utilized for allocating bits and masking quantization noise. By utilizing MDCT, the output data rate is maintained the same as the input data rate. Also, the better energy compaction of MDCT leads to improved coding efficiency. In MPEG-2 AAC, the MDCT operates at a sampling frequency of 48 kHz and can have a block length of 2048 or 256 time samples.

The energy adaptation method applies to a variety of psychoacoustic models, which operate on magnitude and phase of discrete frequency domain samples. The method sub-divides the spectrum into groups of frequency components. The spectrum is sub-divided into groups in a warped scale, as is typical with frequency scales used for HAS modeling, where the number of neighboring frequency components per group range from one at low frequencies to up to a critical band of frequency components at the upper end of the range. One example of a grouping is the sub-dividing of frequency components into partitions, as in the psychoacoustic model 2 used in the MPEG-1 Audio codec where partitions range from one frequency component at low frequencies and up to around ⅓ of a critical band for higher frequencies. Though preferable due to the ability to exploit critical band theory, the use of a warped scale is not required for energy adaptation.

The method derives masking energies for each group from the frequency components within the group (14). A variety of psychoacoustic modeling methodologies may be used to derive the masking energy per group, examples of which are detailed further below. Some examples include determining maskers within a group and then decimating non-relevant maskers as in psychoacoustic model 1 of ISO/IEC 11172-3: 1993 or determining masking energy per partition by pooling energy with a group as in psychoacoustic model 2 of ISO/IEC 11172-3: 1993. See, Information technology—Coding of moving pictures and associated audio for digital storage media at up to about 1.5 Mbit/s—Part 3: Audio, which is hereby incorporated by reference ("ISO/IEC 11172-3: 1993").

The MPEG-2 AAC standard has a conceptually similar psychoacoustic model, with some updates in the coding scheme in which it is used to get similar audio quality at lower bitrates. The energy adaptation method also applies to audio signal processing employing AAC's perceptual model, as well as similar models used in other codecs like Dolby's AC3.

After deriving the group masking energies (14), the method allocates the masking energy of a group to the frequency components within a group (16). The resulting mask thresholds per frequency component are then buffered (18) along with the audio signal for use in subsequent audio signal processing (e.g., quantization in audio compression, or application to digital watermark insertion).

The purpose of mask energy adaptation is primarily to mitigate the loss of frequency resolution due to the decimation or partitioning and pooling of the frequency maskers.

Figure 2:
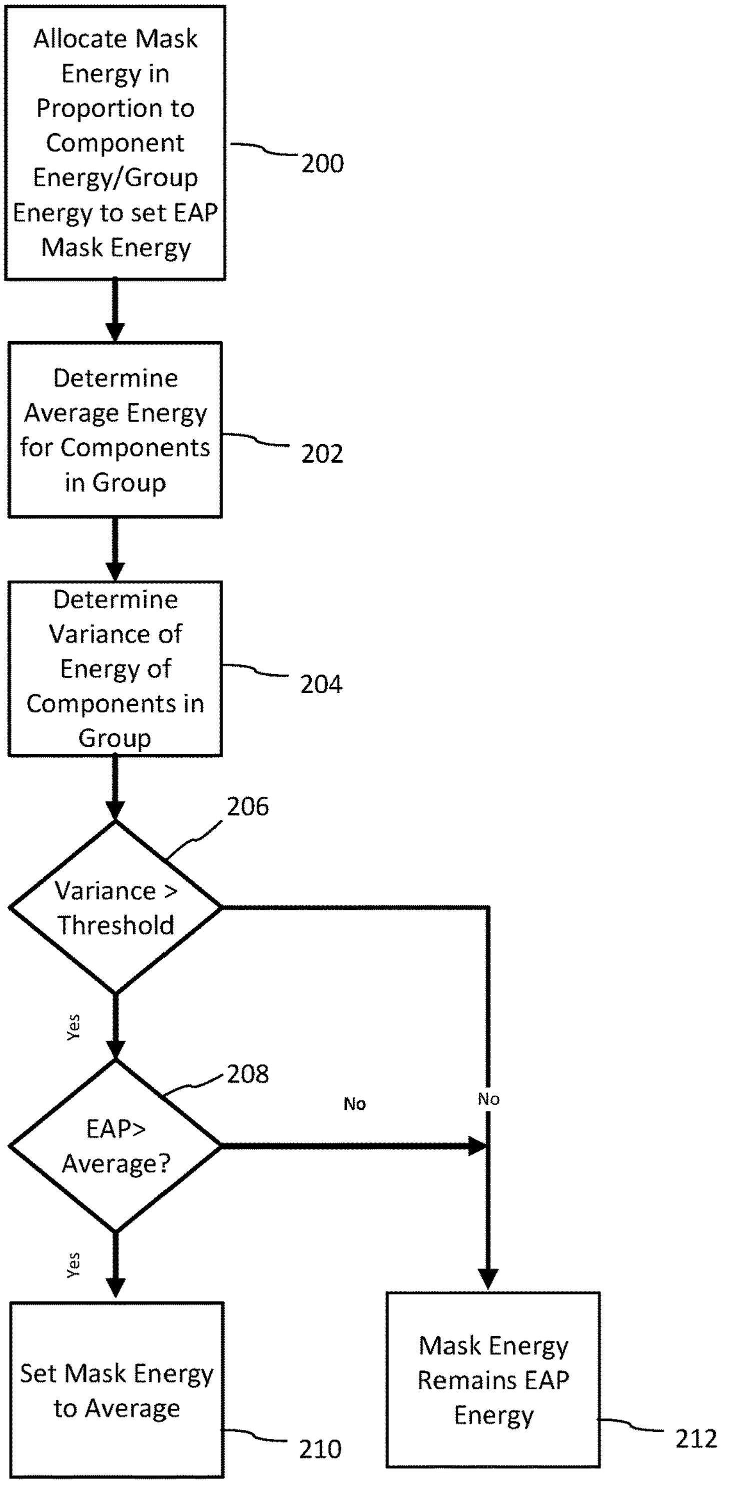
FIG. 2 is a diagram illustrating an embodiment of masking energy adaptation.

FIG. 2 is a diagram illustrating processing operations of an embodiment of masking energy adaptation. The adaptation begins with the final masking energies generated for corresponding groups of frequency components of a block of audio signal. Instead of a constant allocation (total mask energy of the group/number of frequency components in the group) of mask energy within a group, the mask energy is allocated to each frequency component based on the proportion of the corresponding host energy at that frequency component to the total energy of all the host frequency components within a group (200).

In cases where the signal is rapidly changing within a group, characterized by high variance in host energy values, a different allocation is made just for the frequency components where the host energy exceeds the average energy value of the group. To determine when to alter the allocation, the method determines the average energy of the frequency components in a group (202) and the distribution of the energies of the components in the group. This method computes the average as: total mask energy of group/number of frequency components. It determines the distribution of the energy within a group by computing variance (204).

For each group with a variance above a threshold (206), the adapted mask energies are evaluated and adjusted so as not to exceed the average mask energy of the group. This latter correction in high variance cases is necessary to account for the "Near miss" of Weber's law in auditory system. The discrimination of audio improves at higher intensities. A high variance in host energy is indicative of the presence of high energy ("spiky") audio components relative to other audio frequency components within a group.

To factor in the generally better intensity discrimination of these components as discussed in "Near miss" of Weber's law, an adjustment is made in the allocation of the mask energy such that it does not exceed the average mask energy of a partition. Within a group with high variance, the method compares the adapted energy of each frequency component with the average energy of the group (208). Where the adapted mask energy exceeds the group average, the method sets the final mask energy of a component to the group average (210). Otherwise, the adapted mask energy remains as allocated from the previous adaptation (212).

In an implementation for use in digital watermark masking, an additional final check is made to ensure that all of the adapted mask energy thresholds are below the highest intensity (energy) frequency component of the host at least by a predetermined factor which is application dependent. For example, in one implementation for digital watermark insertion, the masking model employs a factor of 0.25. This means that the digital watermark encoder employs the masking model with this additional parameter applied to the final adapted masking thresholds within each group such that the amplitude of the magnitude of frequency components of the watermark signal for that group are limited to 0.25 of the highest energy host audio signal component in the group. After these final adapted thresholds are set, a digital watermark encoder may adjust them when establishing the digital watermark signal level within a host audio signal. In some digital watermarking applications, for example, the watermark signal strength is increased by a gain factor of 2 in frequencies above 2500 Hz. This may be achieved by raising the final adapted threshold in selected bands by this gain factor before applying the mask to set the watermark signal level.

Figure 3:
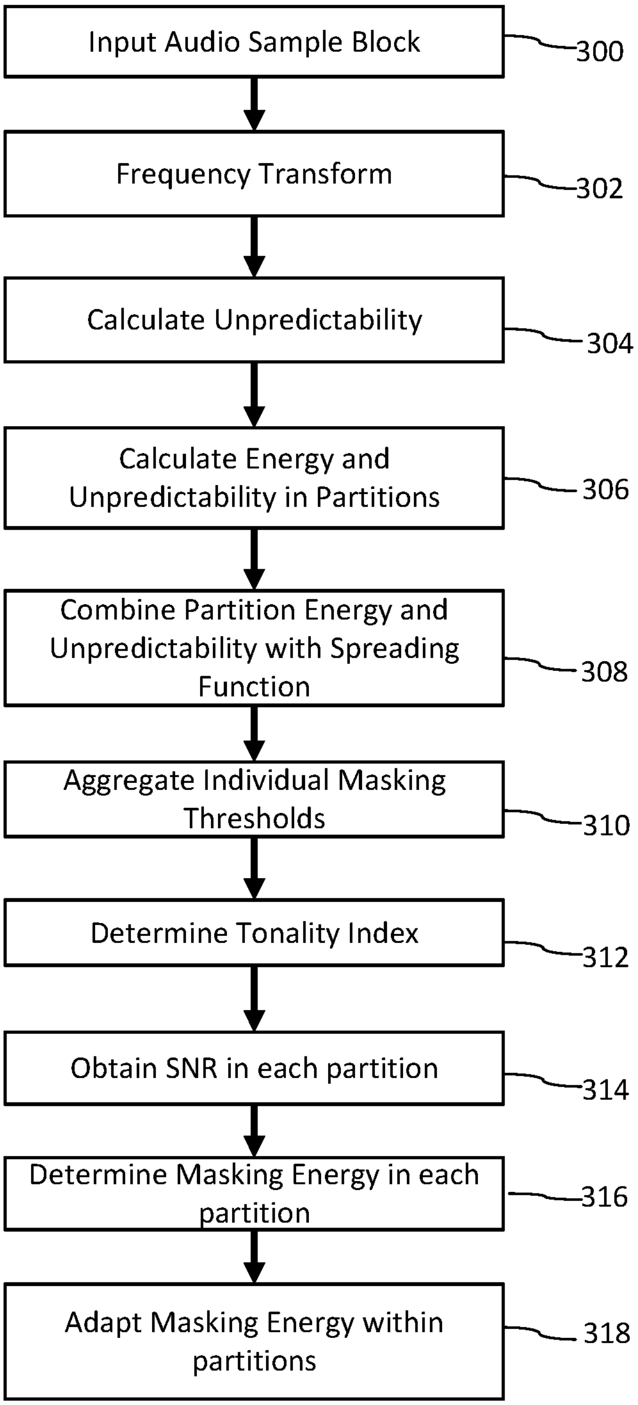
FIG. 3 is a diagram of illustrating masking energy adaptation in the processing flow of generating and applying a HAS model.

FIG. 3 is a diagram of illustrating masking energy adaptation in the processing flow of generating and applying a HAS model. With this diagram, we describe the operations of generating a HAS model with adapted masking energies in more detail. We do so using the particular implementation that is based on the psychoacoustic model 2 of ISO/IEC 11172-3: 1993. See also, U.S. Pat. No. 5,040,217, which is hereby incorporated by reference, for more information on this psychoacoustic model and application of it for audio compression. Based on this example, one can modify the method to apply to other psychoacoustic models with varying strategies for grouping frequency components for masking assessments, obtaining tonality and noise measurements per group, and determining masking effects of maskers on each maskee (e.g., with various spreading functions and techniques for determining combined masking effect of a maskers on a maskee), etc.

We have implemented the processing blocks in this diagram in software instructions (e.g., Matlab and C programming languages) and detail the operations performed by a processor programmed to execute these instructions. The processing blocks may be entirely, or in part, converted to special purpose integrated circuit, programmable circuits (e.g., FPGA), firmware for an embedded processor (e.g., DSP) or partially programmable, application specific circuits based on this description.

In block 300, the processor acquires the next block of input audio samples from a digitized audio stream. This particular implementation operates on blocks of 1024 samples, at a sampling rate of 48 kHz, where each block overlaps a previous block by an overlap parameter (e.g., ½ block length). Since blocks overlap, the processor need only require the newest samples not overlapping the previous block. The samples may be delayed in either the processing flow of this psychoacoustic masking generation or in the preliminary signal processing leading up to application of the mask so that the time window of the mask is centered on the time window of the audio signal processing in which the mask is applied. For audio compression, this preliminary signal processing is, for example, the filterbank applied to the audio signal prior to quantization/bit allocation. In digital watermarking, examples of preliminary signal processing may include watermark signal generation and host audio signal preparation (e.g., sampling rate conversion, complex spectrum generation, etc. for use in watermark signal construction).

Block size and sampling rate may vary with the application. For many applications, there is a trade-off of frequency resolution and temporal resolution. Shorter blocks provide better temporal resolution, whereas longer blocks provide better frequency resolution per frequency component. Blocks of different sizes, e.g., a short block and long block, may be processed and used to generate perceptual masks. For example, the perceptual masking operations may be adaptively selected, including selecting short or long blocks for obtaining thresholds, depending on audio characteristics.

In block 302, the processor converts the current block into the complex audio spectrum for mask generation. This is comprised of applying a window function, followed by an FFT. As in psychoacoustic model 2 of MP3, the frequency transform produce frequency components for 513 bins. This particular embodiment applies a similar approach.

One other factor that can have an impact on audio quality is the type of windows used in the analysis-synthesis process. In some digital watermarking embodiments, Hann or sine window functions are used in the simultaneous masking model.

In audio compression, such as the Dolby AC codecs and MPEG AAC, Kaiser-Bessel derived (KBD) windows are used. More information can be found in M. Bosi and R. E. Goldberg, Introduction to Digital Audio Coding and Standards. Kluwer Academic, 2003.

Windows are selected based on the characteristics of the audio signal and its impact on masking. A fine frequency structure with low spectral flatness may lead to a preference for a sine window. While a coarser frequency structure with higher spectral flatness may lead to a selection of a KBD with parameter 0.4. Also, the spreading of the maskers' energy by the window can have a perceptible impact.

The window length may also be modified depending on the stationarity properties of the audio, that is, whether the audio is characterized by transients or steady-state components. This dynamic selection of windows based on the audio content is used in audio compression, and may also benefit digital watermarking applications.

Some of the main considerations in selecting a window are the resolution versus leakage trade-off and its impact on the mask computation. In most applications, it is necessary that the windows lead to perfect reconstruction following an overlap and add reconstruction.

In block 304, the processor determines unpredictability of the current block. This is a preliminary step of deriving audio characteristics to assess tonality or stationarity vs. noise-like or non-stationarity characteristics of the audio at this point in the signal. Unpredictability, in this context, refers to a measure of how the audio signal is changing from one block to the next. One embodiment employs the unpredictability measure from the psychoacoustic model 2 of MPEG-1 Audio. First, the predicted magnitude and phase of the frequency components are calculated from the two previous blocks, which are used in the unpredictability measure. For details on this unpredictability measure, please see: ISO/IEC 11172-3: 1993.

In block 306, the processor computes the energy and unpredictability in neighboring groups of frequency components called partitions, following the methodology in model 2 of MPEG-1 Audio. There are various ways to group neighboring frequency components into partitions, and the partition approach of model 2 of MPEG-1 Audio is just one example. Preferably, partitions should group neighboring frequency components according to critical bands. Frequency components are partitioned such that the first 17-18 partitions have a single component (components 1-17 of the 513 bins), and then the number of frequency components per partition then increase, similar to the number of frequencies per critical band. In model 2, partitions roughly comprise ⅓ of a critical band or one FFT line, whichever is wider at that frequency location. There are 58 partitions of the 513 frequency components, but again, those parameters may vary with the implementation.

The number of groups of frequencies depend on parameters such as sampling frequency and FFT frame size as well as on the non-linear frequency scale used for modeling the frequency-space characteristics of the basilar membrane of the HAS. Although the frequency range of human hearing is ideally between 20 Hz and 20 kHz, the sampling frequency may or may not capture the entire frequency range up to 20 kHz. For a given sampling frequency, the frequency resolution is impacted by the FFT frame size. A lower frequency resolution could lead to a coarser approximation of the basilar membrane characteristics leading to relatively fewer partitions. The actual number of partitions will depend on the exact non-linear transformation of the linear frequency scale to basilar membrane frequency ranges. Experimental studies have led to several variations of the frequency mappings such as Bark scale, critical bandwidth, ERB and so on.

For the particular case of MPEG 1 Psychoacoustic model 2, there are 58 partitions for a sampling frequency of 48 kHz and an FFT size of 1024 samples. The energy for a partition is the sum of the energies of the frequency components within the partition. The energy of a component (also referred to as intensity) is square of the magnitude of the frequency component (e.g., the Fourier magnitude squared, for a Discrete Fourier Transform implementation).

When the perceptual model is used to control perceptibility and robustness of a digital watermark, there are additional factors that govern the number, size and frequency range of groups. The choice of these parameters, and associated critical bands and masking curves (i.e. spreading functions) are dictated by the tradeoffs between perceptibility of the digital watermark and its robustness. The perceptual model results in a masking value per group that is adapted based on the frequency content within a group. One adaptation is the one depicted in FIG. 2 and accompanying text. Another adaptation for digital watermarking applications is where the mask value is limited to a factor (e.g., 0.25) of the highest frequency component in a group, to reduce perceptibility of the watermark. Another adaptation is to further adjust the value by another factor for higher frequencies (e.g., 2 for frequencies above 2500 Hz), as the watermark is less perceptible at these frequencies and increasing the watermark signal improves robustness. Another reason for not increasing the gain of the watermark below the first 2500 Hz is that the host interference is usually significant in the low frequencies (leads to higher bit-error rate). Therefore, the resulting watermark robustness-perceptibility trade-off is not favorable in this frequency range.

In this context, another approach to grouping is to construct mask values at a higher frequency resolution so that they naturally adapt to the host content when these adaptations based on the host content are applied for digital watermarking applications. However, there is a cost to achieving higher frequency resolution. A higher frequency resolution leads to lower temporal resolution. A lower temporal resolution perceptual model is potentially damaging to watermark perceptibility. A lot can happen in audio or speech within 10 to 20 mS. Therefore, constructing mask values at higher frequency resolution, means the mask values are based on longer frame sizes and hence there is a loss of temporal granularity. Loss of temporal granularity could lead to unwanted perceptible artifacts especially in non-stationary segments of audio such as transients.

The weighted unpredictability of the partition is computed as the sum of the product of frequency component energy and unpredictability measure for the frequency components in the partition.

In block 308, the processor combines the partition energy and weighted unpredictability with the spreading function. A spreading function models the extent of masking due to a particular masker on neighboring groups of frequencies or partitions. For this operation, this embodiment applies a similar approach as in model 2 of MPEG-1 Audio, which involves a particular variation of Schroder spreading function as shown below.

$$10\log_{10}(SF(z_e, z_r)) = 15.8111389 + 7.5*(1.05*(z_e - z_r) + 0.474) - 17.5*\sqrt{1.0 + (1.05*(z_e - z_r) + 0.474)^2} + 8*\mathrm{MIN}(0, (1.05*(z_e - z_r) - 0.5)^2 - 2*(1.05*(z_e - z_r) - 0.5))$$

Here the difference term $(z_e - z_r)$ indicates the frequency difference between the maskee and masker in the warped bark frequency scale. In this case, for each partition, the contribution of spreading from maskers present in all partitions is determined. A typical audio signal is characterized by multiple concurrent maskers and maskees. Every maskee is also a masker and concurrently exerts a masking effect on other maskees. As a result, several weighted masking thresholds due to the impact of all possible maskers is obtained for every maskee partition.

Other spreading functions can be used in place of the one shown above. For more on spreading function, please see, M. Bosi and R. E. Goldberg, Introduction to Digital Audio Coding and Standards. Kluwer Academic, 2003. Experiments have demonstrated a frequency and level dependence of spreading functions on masker frequency. As an example, the following variation of the Schroeder spreading function which factors the impact of masker SPL on the spreading could be used.

$$10\log_{10}(SF(z_e, z_r)) = (15.81 - I(L_M, f)) + 7.5((z_e - z_r) + 0.474) - (17.5 - I(L_M, f))\sqrt{1.0 + (1.05*(z_e - z_r) + 0.474)^2}$$

Here, $(z_e - z_r)$ is the Bark scale difference between the maskee and the masker frequency and $L_M$ is the masker's SPL. The level adjustment function $I(L_M, f)$ is defined as follows in the Schroeder model.

$$I(L_M, f) = \min\left\{5\ 10^{(L_M - 96)/10}\frac{df}{(z_e - z_r)}, 2\right\}$$

The $df = (f_e - f_r)$ term is the linear frequency difference between maskee and masker.

In block 310, the processor aggregates individual masking thresholds at each frequency grouping due to the various maskers to determine the combined masking effect. One embodiment for digital watermarking combines the individual masks $(M_g)$ in the following manner.

$$M_G = \sum_{g=0}^{G-1} M_g$$

The above formula indicates a simple addition of maskers. In other embodiments, the aggregate masking threshold could be taken as the maximum of the individual masking thresholds. Or the aggregate masking threshold could be obtained by computing a p-norm of individual masking thresholds, with p=3 or other appropriate values.

Attributes of a real world audio signal such as multiple maskers and maskees, relative phase changes within a narrow frequency grouping, and actual shape of the auditory filters are not completely understood phenomena. Hence their impact on masking is not completely understood. Moreover, there are dependencies between these different phenomena which makes it challenging to fit a unified model of masking. Additional information can be found in B. C. J. Moore, An Introduction to the Psychology of Hearing, Emerald Group Publishing Limited, Fifth Edition, 2004, pp. 66-85. The available state-of-art models for combining masking impact of individual maskers are coarse approximations of the "true" masking behavior of the auditory system.

In block 312, the processor estimates the tonality of each partition based on the normalized aggregate masking threshold. Tonal components are more predictable, and as such, have a higher tonality index. The processor normalizes the spread unpredictability measure. The processor then converts the normalized unpredictability measure into tonality index, which is a function of partition number. One embodiment uses the method presented in MPEG-1 Audio for determining the tonality index of each partition. The tonality index is a value between 0 and 1, with highly tonal components having values closer to 1. For details on this tonality index, please see: ISO/IEC 11172-3:1993.

In block 314, the tonality index (TI) is used to determine the signal to noise ratio (SNR) for each partition. The masking threshold is reduced by an amount determined by the SNR. The SNR computation involves the application of an offset parameter depending on whether the signal within the partition is tonal or noise-like. In order to factor the lower masking ability of tonal maskers compared to noise-like maskers, the offset value ($\Delta=\Delta_T$) is higher for tonal signals. Noise-like maskers are more effective in masking and their offset ($\Delta=\Delta_N$) values are hence lower. One embodiment uses the offset values and SNR computation presented in MPEG-1 Audio, the details of which are found in ISO/IEC 11172-3:1993. Alternately, the offset values for tonal and noise-like maskers presented in N. Jayant, J. Johnston, and R. Safranek, Signal Compression Based on Method of Human Perception, Proceedings of IEEE, Volume 81, no. 10, pp. 1385-1422, October 1993 could be used. These offset values are as follows.

$$\Delta_T=14.5+z \text{ dB}$$

$$\Delta_N=[3,6] \text{ dB}$$

In this notation, T refers to Tone, N refers to Noise and z refers to the bark scale center frequency of the masker.

The offset factor is then used to obtain the signal to noise ratio (SNR) within each partition by weighing $\Delta_T$ offset by the tonality index (TI) and the $\Delta_N$ offset by (1−TI).

In block 316, the processor determines the final masking threshold ($Th_G$) in each partition by combining the SNR value ($SNR_G$) and the aggregate masking threshold ($M_{NG}$) for the partition or grouping of frequencies. One embodiment uses the method found in Psychoacoustic model 2 of MPEG-1 Audio found in ISO/IEC 11172-3:1993 and is shown below.

$$Th_G = M_{NG} * 10^{-SNR_G/10}$$

In block 318, the mask energy is adapted using the energy adaptation method depicted in FIG. 1 and the masking energy thresholds are obtained at the target frequency resolution. As a result of energy adaptation, masking energy thresholds at every frequency of the group of frequencies are obtained by factoring the energy of the corresponding magnitude squared or energy value at that frequency. As discussed earlier, the variance of the energy (magnitude squared) values within a group influences the exact method for adapting the group masking energy threshold. The energy adaptation method leads to improved frequency resolution of the masking thresholds, which leads to better audible effects such as mitigation of roughness in the perception of sound.

Figure 4:
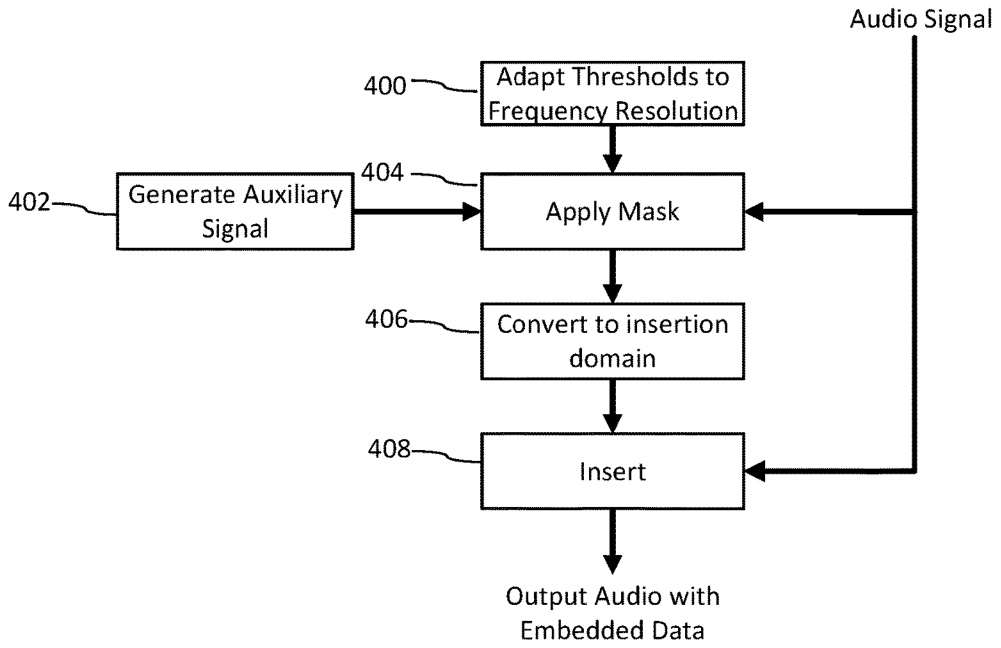
FIG. 4 is a diagram illustrating a method of applying the perceptual model to digital watermarking.

FIG. 4 is a diagram illustrating a method of applying the perceptual model to digital watermark signals. Each of the blocks may be implemented in digital logic circuitry or by a processor executing instructions. We describe the operations within each block to facilitate implementation in either.

In block 400, the thresholds are adapted to a target frequency resolution for application to a digital watermark signal. Interpolation is used to map the perceptual model thresholds to the frequency resolution of the watermark signal.

The frequency resolution of the thresholds may be greater than, the same, or less than the frequency resolution of the digital watermark signal. For example, where the audio watermark embedder encodes the watermark signal in longer audio blocks then those used for deriving the perceptual model, the frequency resolution of the thresholds is lower than the frequency resolution of the watermark signal. Conversely, where the audio watermark embedder encodes the watermark signal in shorter audio blocks then those used for deriving the perceptual model, the frequency resolution of the thresholds is greater than the frequency resolution of the watermark signal.

There is a trade-off between temporal resolution and frequency resolution. Shorter blocks provide greater temporal resolution, which enables adaptation to audio features at a higher temporal granularity. Encoding digital watermarks at higher frequency resolution provides additional granularity of embedding locations along the frequency scale, and thus, more opportunities to insert data over the frequency scale of each audio block.

Deriving the perceptual model from shorter blocks reduces latency for real time or low latency watermark encoding (e.g., for live audio stream encoding or insertion in-line with transmission). See more information on low latency embedding in co-pending applications, PCT/US14/36845, filed May 5, 2014 (and U.S. counterpart application Ser. No. 15/192,925, filed Jun. 24, 2016, US Application Publication 20150016661, and 62/156,329, filed May 3, 2015 (and U.S. non-provisional application Ser. No. 15/145,784, filed May 3, 2016), which are hereby incorporated by reference.

Some embodiments described above list a block size of 1024 at a sample rate of 48 kHz for the perceptual model. This block size may be smaller or larger, e.g., 512, 2048 or 4096 samples, sampled at audio sample rates, e.g., 16, 32, 48 kHz. A larger frame size is based on lower temporal resolution capture of the underlying host audio signal and the resulting perceptual thresholds would have this drawback as they will not capture the fine structure of audio in highly time-varying segments.

The block size and sample rate of the watermark signal may also vary, e.g., 512, 2048 or 4096 samples at audio sample rates, e.g., 16, 32, 48 kHz. By dividing the block size by sample rate, one gets the block size in seconds, e.g., a 1024 sample block at 48 kHz sample rate is about 21.3 milliseconds long. Where the watermark signal block is 2048 samples at 16 kHz for example, it is 128 milliseconds long. This case of short block perceptual model (e.g., 21.3 ms) and longer block watermark signal (128 ms) is an example where the watermark signal is at higher frequency resolution than the perceptual model. Interpolation is applied to the lower resolution perceptual model to adapt to the higher resolution watermark signal.

In one watermarking scheme, the watermark in adjacent frames has reverse polarity. This allows the detector to increase the watermark signal to noise ratio by subtracting adjacent frames, removing host content that is common over the adjacent frames. The frame size for adjacent frames may correspond to the above noted block size and sample rate of the watermark signal, e.g., 512, 2048 or 4096 samples, sampled at audio sample rates, e.g., 16, 32, 48 kHz.

The frame reversal may also be applied at different watermark frame sizes for different frequencies. High frequency audio content varies more over a period of time than long frequency audio content. High frequency components of the host audio signal are much more rapidly varying in the time domain relative to low-frequency components. Thus, to better exploit the correlation of audio content in adjacent frames, the frame size of adjacent frames in which the watermark signal is reversed is shorter for high frequency content than for low frequency content. By more closely adhering to the correlation properties of adjacent frames, the subtraction of adjacent frames removes more host content and boosts the watermark signal in the detector. For example, lower frequency watermark components (e.g., below a frequency of 2500 Hz-4000 Hz) reverse in frames of length 128 ms (e.g., 2048 samples at 16 kHz sample rate), whereas higher frequency watermark components reverse in frames of length 64 ms (e.g., 1024 samples at 16 kHz). These parameters are just examples, and others may be used, depending on the application, audio content type, etc.

An approach like a filter bank may be employed where the watermark signal is sub-divided into sub bands, each with corresponding watermark frame reversal rate. For these cases, the perceptual model may be adapted to the resolution for each band of the watermark signal, e.g., using an interpolation where the perceptual mask is at a lower frequency resolution that the watermark signal. Alternatively, the perceptual model may be computed for each subband of the watermark signal at a resolution corresponding to the subband.

There are a variety of interpolation schemes that may be employed in block 400, including linear and non-linear schemes. In one implementation, where lower resolution thresholds are mapped to a higher resolution watermark block, the processing of block 400 employs an interpolation that is a combination of a linear interpolation and sample and hold. Sample and hold refers to an equal spread of the value at a lower frequency resolution coordinate to corresponding frequency coordinates at a higher frequency resolution. To combine the two, one implementation sets the threshold at the higher resolution coordinates to be the lower of the linear interpolation and sample and hold values at each coordinate at the higher frequency resolution.

In block 402, the digital watermark signal is generated. There are many schemes for generating the digital watermark signal, which we elaborate on below and which are detailed in the incorporated patent documents. In one approach, watermark signal generation takes a sequence of message symbols to be encoded and converts them to a watermark signal by applying robustness coding, such as error correction and modulation with a carrier to create watermark signal elements. The watermark signal elements are mapped to embedding locations (e.g., time domain or frequency domain coordinates). This signal generation process prepares the watermark signal to be inserted at the embedding locations of the host audio signal based on values of the watermark signal elements at the embedding locations, adapted according to the thresholds.

Preferably, the thresholds are applied to a frequency domain format of the watermark signal. In one form of watermark typically referred to as a "frequency domain" watermark, the coded message symbols are generated and mapped to frequency domain coordinates. The thresholds are applied to control the frequency magnitude of the watermark signal at the frequency domain coordinates.

If the watermark signal is not natively constructed in the frequency domain, it is converted into a frequency domain for application of the thresholds. One example of this case is an implementation where the watermark signal is generated as a time domain signal. The time domain watermark signal is mapped to embedding locations in time domain coordinates. Blocks of this time domain watermark signal corresponding in time to the host audio blocks for the perceptual model are converted to the frequency domain (e.g., with FFT function). A window function is applied to the watermark signal to allow for appropriate reconstruction when converted to the time domain (e.g., IFFT). When converted to the frequency domain, the time domain signal is converted into magnitude and phase components, and the thresholds are applied to the frequency magnitude components.

In block 404, the thresholds ("mask") are applied to the watermark signal for a block of audio. The frequency magnitude of the watermark signal is adjusted, as needed, to be within the threshold at frequency coordinates where it would otherwise exceed the threshold when inserted in the host audio signal. Where the watermark signal is at a higher frequency resolution than the thresholds, there are some number of short audio blocks of perceptual models for each long block of watermark signal. In this case, the watermark signal is generated for each of the short blocks (e.g., 21.3 ms audio blocks of the perceptual model), but at the higher target frequency resolution (e.g., the frequency resolution of the watermark signal block, 128 ms). The interpolated thresholds for each short block are applied to the frequency magnitude components of the watermark signal, producing a watermark signal for each short block, but at the higher frequency resolution of the long block.

For a watermark signal constructed in the frequency magnitude domain, there are various options for constructing phase of the watermark signal. In one approach, the phase of the long block of host audio is paired with each set of the adapted frequency magnitude components of the watermark signal for each of the short blocks. In another approach, phase components of a phase based watermark signal may be paired with each set of adapted frequency magnitude components. The phase components are phase modulated (e.g., shifting in phase) according to values of coded message symbols (e.g., bit values of 1 and 0, correspond to phase shifts). In another approach, a pseudorandom phase may be paired with the magnitude components.

For a time domain watermark signal, which has been converted to the frequency domain, the frequency magnitude of the watermark signal is adjusted, as needed, to be within the threshold at frequency coordinates where it would otherwise exceed the threshold when inserted in the host audio signal. The phase of the watermark signal is then paired with the corresponding magnitude components of the watermark signal, now adjusted according to the thresholds.

Above, we described a frame reversal approach in which frame reversal is applied at different rates for different frequency bands. Shorter frames are used for higher frequency bands. In one example, a long frame of 128 ms (2048 samples at 16 kHz) is used for frame reversal of a low frequency band (e.g., 0 up to a frequency of 4000 kHz). A shorter frame of 64 ms (1024 samples at 16 kHz) is used for frame reversal of a higher frequency band (e.g., 4001 kHz up to 8000 kHz). The frequency range of the watermark may be broken into more than these two subbands, and this is just an example. For example, a filter bank approach may be used to sub-divide the frequency range into different bands of varying frame length used for frame reversal. Band pass filters sub-divide the frequency range for perceptual modeling and watermark signal generation. This may be implemented by applying discrete frequency domain transforms (FFTs, subband filtering or the like) to the host audio signal for generating the perceptual model and watermark signal per subband.

In some embodiments, it is desired to maintain the frequency resolution of the watermark signal across these frequency bands. For example, in some protocols, the error correction encoded watermark signal elements are mapped to equally spaced frequency bins (e.g., bins 18 to 1025 in a frequency range of 0 to 8 kHz of a long block of 2048 samples, sampled at 16 kHz). However, when frame reversal is applied at different rates with a long block at low frequency and a progressively shorter block for higher frequency subbands, the frequency spacing drops with the decreasing block size. In order to maintain the frequency resolution of the watermark signal across the low and high frequency bands, zero padding may be used. For example, zero padding is applied to the time domain of a host audio signal block to generate the watermark signal for high frequency bands. In the above example where the long block is 128 ms, and a short block is 64 ms, the short blocks used to generate the watermark signal for the high frequency band are zero padded in the time domain (extended in length from 1024 to 2048 samples to match the long block).

In this case, zero-padding is used to obtain the long frame magnitude and phase of the host audio signal for the high frequency watermark signal components. For example, the zero padded block, now 2048 samples long in the time domain, is converted to a frequency domain by FFT. The magnitude of the host audio signal is used to ensure that when the watermark signal is reversed in the adjacent frame, it does not drop the host signal magnitude below zero. If it does at a frequency location, the watermark signal magnitude at the frequency location is limited to prevent it. The phase of the host audio signal is paired with high frequency magnitude components of the watermark signal at the frequency resolution of the long block. The perceptual model mask values are similarly interpolated (same as the low frequency subband case) to accommodate the high frequency watermark signal components. This approach ensures that a certain predetermined number of watermark payload bits can be embedded across the frequency range. For example, where before the watermark signal is mapped to 1008 equally spaced frequency bins 18-1025 in the range of 0 to 8 kHz of a long block, now the mapping is similar because the frequency resolution of the watermark signal is maintained, yet the low frequency components of the watermark signal are encoded at one reversal rate in the low frequency range, and the high frequency components are encoded at a faster reversal rate for the high frequency range.

To illustrate, we continue with our example using the parameters from above. The interpolation of the perceptual model and generation of watermark signal is carried out for every one of the short frames of the perceptual model (e.g., 21.3 ms) fitting the long frame of the watermark signal (e.g, 128 ms). In the low-frequency case, there are 11 short frames constituting a single long frame (128 ms), where the short frames of perceptually adjusted frequency magnitude of the watermark signal overlap by 50%. In the high-frequency case, there are 5 short frames constituting a single long frame, in this case of duration 64 ms, again with 50% overlap. The frame-reversal happens at twice a rate (for this particular example) in the high frequency subband compared to the low frequency subband. The construction of the watermark signal in either case is the same but just subject to different parameters such as number of short frames and duration of long frame.

The filter-bank approach may or may not involve zero-padding. Whether or not zero-padding is used depends on whether the spacing of the modulated watermark signal elements or the watermark protocol remains the same or different for the different subbands.

In block 406, the watermark signal is converted to the domain in which it is inserted in the host audio signal (the insertion domain). This may be a frequency domain, time domain, or some other transform domain (such as subband coefficients of the host audio). The above processing operations to pair phase with adapted frequency magnitude prepare the watermark signal for conversion to the time domain. For example, the frequency domain watermark constructed for each overlapping short block (recall for example a 1024 block size at 48 kHz (21.3 ms), overlapping by 50%) is converted to the time domain by applying in inverse FFT to threshold adapted magnitude and phase components of each short block. A window function is employed along with overlap and add operations in the time domain to construct the time domain watermark signal from the N overlapping short blocks, where N is the number of short blocks per long audio block. In one implementation, for example, we apply a sine window for the window function. Other window functions may also be used.

The processing of block 408 inserts the watermark signal into the host audio signal. The insertion function may be a sum of the adapted time domain watermark signal to the corresponding time samples of the host audio signal. The timing is coordinated so that the samples to which the watermark signal is added are the same as the samples from which the watermark is adapted. Various optimizations may be employed in the time domain, such as temporal masking, temporal gain control, e.g., for pre and post echo mitigation, etc.

Saturation control may also be employed to ensure watermark adjustments do not exceed the dynamic range of the host audio. One method of saturation control is to scale the audio signal linearly to improve available head room in the dynamic range to make watermark signal adjustments. Another strategy is limit the sum of watermark and host audio to within upper and lower clipping limits and perform a gradual clipping function. Another strategy is to limit the watermark signal only, clipping only the watermark as opposed to the sum, with a gradual clipping function. To balance the tradeoff of time and frequency resolution of the clipping function, one implementation employs a Gaussian shaped window function as the gradual clipping function.

This smooths the reduction in the watermark signal magnitude to prevent artifacts. Listening tests have shown that the watermark signal is preferably reduced to zero where the host audio signal is near the limit of its dynamic range, rather than reducing the watermark signal so that the watermarked signal at that location is at the maximum of the dynamic range.

Pre-conditioning of the audio signal may also be employed to increase watermark embedding opportunities. One form of pre-conditioning is to apply an Orban processor to increase loudness, dynamic range, and provide equalization to increase the opportunities to embed more watermark signal. Additional forms of pre-conditioning operations include adding echoes and/or harmonics of the host audio signal. These additions are added selectively at time and frequency locations (e.g., subbands of a weak audio signal block) where host signal energy for inserting the watermark signal is below an energy threshold. Examples of adding audio signal energy include adding echoes or harmonics of a particular time-frequency region in the spectrogram of the host audio signal. This processing effectively increases the thresholds of the perceptual model, which improves the robustness of the watermark signal for broadcast, e.g., for radio or TV broadcast. For instance, the above perceptual model is used to identify time blocks or frequency subbands within time blocks where this pre-conditioning is applied prior to watermark insertion.

In one embodiment, pre-conditioning is an iterative process in which the perceptual model processes the host audio signal to identify time/frequency locations for pre-conditioning, pre-conditioning is applied to modify the host signal content (e.g., through loudness adjustment, dynamic range expansion, host audio echoes and/or harmonics per time-frequency region, and/or equalization applied to the host audio signal, each being derived from the host audio), the perceptual model is then re-applied to provide a new perceptual mask thresholds for controlling watermark insertion in the pre-conditioned audio signal.

Alternatively, the perceptual model is applied once to both classify a host audio signal block for pre-conditioning and produce thresholds for hiding the digital watermark in the pre-conditioned audio signal. The classification process identifies audio blocks and subbands in which to boost host signal energy. The encoder adds this energy, staying within the threshold set by the perceptual model (e.g., by echo insertion, or other signal boost noted). The perceptual model indicates the subband(s) and signal level of host signal energy to insert for pre-conditioning. As such, the threshold it generates indicates the masking thresholds for pre-conditioning and for inserting a watermark in the pre-conditioned signal. The digital watermark encoder inserts the audio watermark in the audio block according to the thresholds of the perceptual model. This approach is efficient for real time or low latency operation because it avoids the need for iterative processing of the perceptual model.

For pre-conditioning to be effective (that is, lead to a favorable audibility-robustness trade-off), the pre-conditioning changes to the audio should be carried out such that the perceptible impact of these changes is acceptable and hence the resulting room for watermark embedding translates to improved robustness. Pre-conditioning is preferably adaptive to the audio production process and/or playback environment. The pre-conditioning adds audio signal content such as echoes or other effects that are either added in the audio production process to enhance the audio content, or are already prevalent in the listening environment (e.g., echoes are prevalent in ambient environments where the audio is played).

For more background on watermark embedding techniques, see U.S. Patent App. Pub. No. 2014/0108020 and application 2014/0142958, as well as U.S. Patent App. Pub. No. 2012/0214515, which are hereby incorporated by reference. See also, U.S. Pat. No. 6,061,793, in which MPEG psychoacoustic models are applied to audio watermarking, and U.S. Pat. No. 6,674,876, which describes additional audio watermarking methods. U.S. Pat. No. 6,061,793 and U.S. Pat. No. 6,674,876 are hereby incorporated by reference.

Additional information on watermark embedding and decoding follows below.

Watermark Embedding

Figure 5:
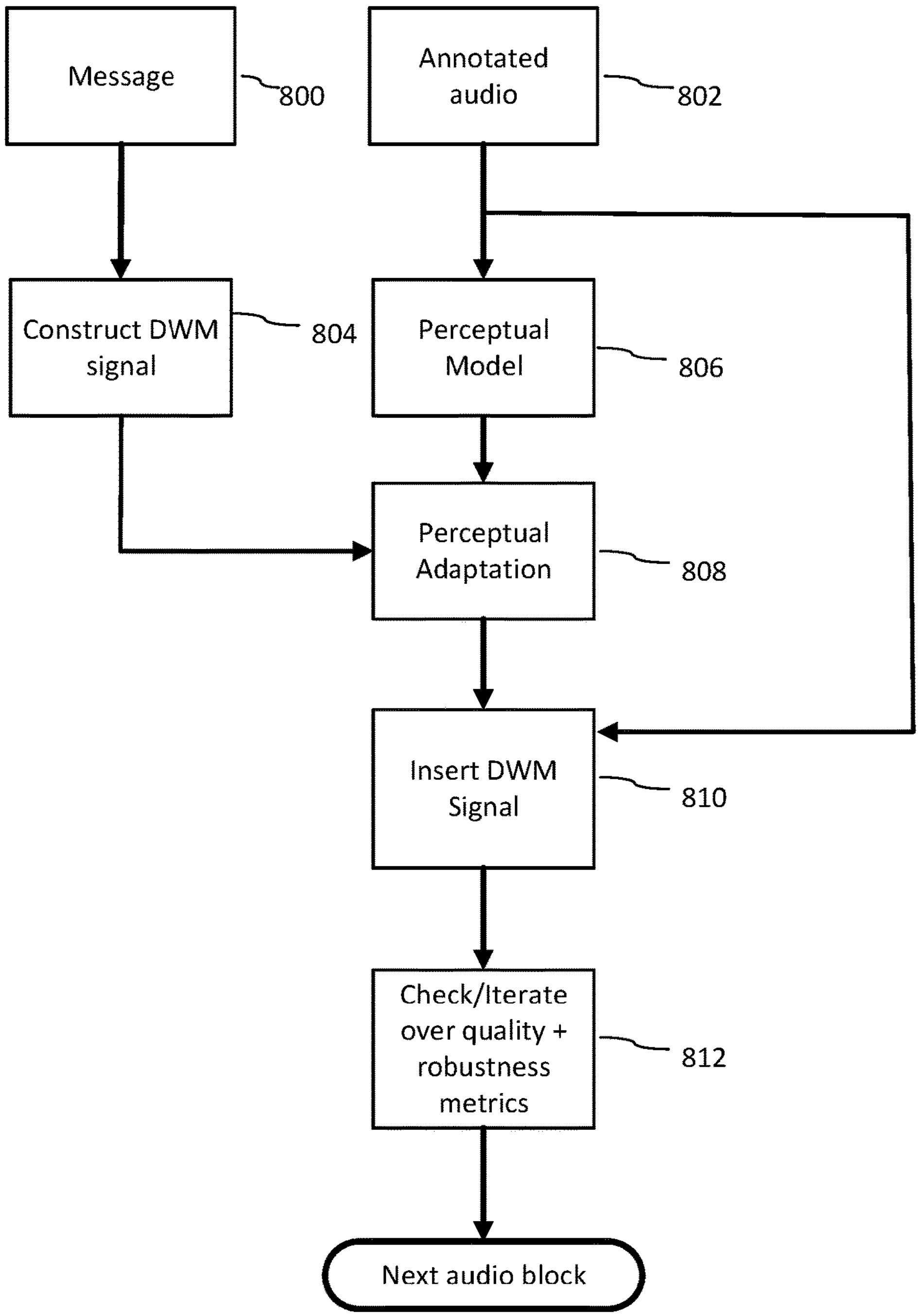
FIG. 5 is a diagram illustrating a process for embedding auxiliary data into audio.

FIG. 5 is a diagram illustrating a process for embedding auxiliary data into audio. This diagram is taken from U.S. Patent App. Pub. Nos. 2014/0108020 and 2014/0142958, in which a pre-classification occurred prior to the process of FIG. 5. For real-time applications, pre-classification may be skipped to avoid introducing additional latency. Alternatively, classes or profiles of different types of audio signals (e.g., instruments/classical, male speech, female speech, etc.) may be pre-classified based on audio features and the mapping between these features may be coded into look up tables for efficient classification at run-time of the embedder. Metadata provided with the audio signal may be used to provide audio classification parameters to facilitate embedding.

The input to the embedding system of FIG. 5 includes the message payload 800 to be embedded in an audio segment, the audio segment, and metadata about the audio segment (802) obtained from classifier modules, to the extent available.

The perceptual model 806 is a module that takes the audio segment, and parameters of it from the classifiers, and computes a masking envelope that is adapted to the watermark type, protocol and insertion method. In addition to the details in this document, please see U.S. Patent App. Pub. No. 2014/0108020 and 2014/0142958 for more examples of watermark types, protocols, insertion methods, and corresponding perceptual models that apply to them.

The embedder uses the watermark type and protocol to transform the message into a watermark signal for insertion into the host audio segment. The DWM signal constructor module 804 performs this transformation of a message. The message may include a fixed and variable portion, as well as error detection portion generated from the variable portion. It may include an explicit synchronization component, or synchronization may be obtained through other aspects of the watermark signal pattern or inherent features of the audio, such as an anchor point or event, which provides a reference for synchronization. As detailed further below, the message (a sequence of binary or M-ary message symbols) is error correction encoded, repeated, and spread over a carrier. We have used convolutional coding, with tail biting codes, ⅓ rate to construct an error correction coded signal. This signal uses binary antipodal signaling, and each binary antipodal element is spread spectrum modulated over a corresponding m-sequence carrier. The parameters of these operations depend on the watermark type and protocol. For example, frequency domain and time domain watermarks use some techniques in common, but the repetition and mapping to time and frequency domain locations, is of course, different. The resulting watermark signal elements are mapped (e.g., according to a scattering function, and/or differential encoding configuration) to corresponding host signal elements based on the watermark type and protocol. Time domain watermark elements are each mapped to a region of time domain samples, to which a shaped bump modification is applied.

The perceptual adaptation module 808 is a function that transforms the watermark signal elements to changes to corresponding features of the host audio segment according to the perceptual masking envelope. The envelope specifies limits on a change in terms of magnitude, time and frequency dimensions. Perceptual adaptation takes into account these limits, the value of the watermark element, and host feature values to compute a detail gain factor that adjust watermark signal strength for a watermark signal element (e.g., a bump) while staying within the envelope. A global gain factor may also be used to scale the energy up or down, e.g., depending on feedback from iterative embedding, or user adjustable watermark settings.

An additional method by which the strength of the watermark signal is adjusted is through the use of a classification technique. For example, in one approach, the energy ratio metric (which looks at the ratio of host audio frame energy in the high (3 to 5 kHz) to low (0 to 3 kHz) frequency regions is used to scale the different subbands of the watermark by a different gain level. Usually, weak (low robustness) frames (we are referring to long frames of audio, e.g., 2048 samples, sampled at 16 kHz) are characterized by low values of energy ratio metric. Depending on the range of values ((i) >0.03, (ii) >0.01 and (iii) <0.01, >0.002 and <0.01, (iv) or <0.002) of the energy ratio metric, one of the four different sets of gain scale factors for the subbands is used. The first frame type (energy ratio metric >0.03) is most robust and the fourth frame type is the least robust (energy ratio metric <0.002) and the watermark strength scale factors are selected to (i) embed at a higher gain for weak frames, (ii) obtain good robustness-audibility trade-off by appropriately selecting (look-up tables based on robustness experiments and subjective testing) subband gain levels.

In one embodiment, there are two levels of categorization of robustness using the energy ratio metric. At the higher level, the energy ratio metric is used to categorize frames according to their ability to embed a robust watermark (this is done prior to embedding unlike iterative embedding approaches). At a finer level, the energy ratio metric is used to categorize subbands of weak frames to determine how exactly to scale the watermark strength corresponding to these subbands for a good robustness-audibility trade-off. The values in a look-up table of subband energy values are experimentally derived. For example, see values with variable name "embedParms.SBEn_FrTy# in the example below. These subband energy levels are used as thresholds to determine whether or not to adjust the watermark gain level at that particular subband as given by a scaling factor given by embedParms.gainAdj_FrTy# for the corresponding frame type. The term with "embedParms.gainAdj_" indicates the actual gain level to be used in the particular subband. The term, _FrTy#, indicates the frame type categorized by the energy ratio metric by the robustness type.

```
embedParms.FeaHighGain = 0;
if embedParms.FeaHighGain == 1
embedParms.FBHGM1 = 1; %A7-v3
embedParms.FBHGM2 = 0; %A9-v4
% Load SB energy threshold limits
embedParms.SBInd_5_32 = 0 0 0 0 1 1 1 1 2 2 2 2 2 2 2 2 3 3 3 3 4
4 4 4 5 5 5 5 6 6 6 6];
```

-continued

```
embedParms.SBEn_FrTy2 = [4,2,6,10,15,0,0; 5,0.6,1.6,3.2,7,10,0;
6,0.3,0.8,2.2,3.2,10,16; . . .
5,0.1,0.5,1,2,4,0; 4,0.07,0.4,1.9,3.5,0,0; 4,0.05,0.3,1.6,3.2,0,0];
embedParms.SBEn_FrTy3 = [4,2,6,10,20,0,0; 4,0.3,1.6,3.2,7,0,0;
5,0.3,0.8,2.2,3.2,7,0; . . .
5,0.1,0.5,1,2,4,0; 4,0.07,0.4,1.9,3.5,0,0;
4,0.05,0.3,1.6,3.2,0,0];
% Load gain adjustment factors
  embedParms.gainAdj_FrTy2 = [4,1.5,1.25,1.1,1,0,0;
  5,1.5,1.5,1.2,1.1,1,0; 6,2,1.7,1.35,1.2,1.1,1; . . .
  5,1.7,1.5,1.35,1.2,1,0; 4,2,1.75,1.5,1,0,0; 4,2,1.75,1.5,1,0,0];
  embedParms.gainAdj_FrTy3 = [4,1.5,1.25,1.1,1,0,0;
  4,1.6,1.5,1.2,1,0,0; 5,2,1.7,1.35,1.2,1,0; . . .
  5,1.7,1.5,1.35,1.2,1,0; 4,2,1.75,1.5,1,0,0; 4,2,1.75,1.75,1,0,0];
if embedParms.FBHGM2 == 1 %A9-v4
  embedParms.SBEn_FrTy4 = [4,0.5,4,14,60,0,0;
  5,0.15,1.6,3.2,8,15,0; 5,0.1,0.8,2.2,3.2,14,0; . . .
  5,0.075,0.5,1,2,10,0; 4,0.03,0.4,1.9,10,0,0;
  5,0.01,0.3,1.6,3.2,10,0];
    embedParms.gainAdj_FrTy4 = [4,2,2,1.6,1,0,0; 4,2,2,2,1.5,1,0;
    5,2,2,2,1.5,1,0; . . .
    5,2,2,2,1.5,1,0; 4,2,2,1.8,1,0,0; 5,2,2,2,1.7,1,0];
else% A7-v3
  embedParms.SBEn_FrTy4 = [4,1,4,8,14,0,0; 4,0.3,1.6,3.2,8,0,0;
  5,0.3,0.8,2.2,3.2,7,0; . . .
  5,0.1,0.5,1,2,4,0; 4,0.07,0.4,1.9,3.5,0,0;
  5,0.05,0.3,1.6,3.2,6,0];
  embedParms.gainAdj_FrTy4 = [4,1.5,1.75,1.5,1,0,0;
  4,1.8,1.6,1.2,1,0,0; 5,2,2,1.5,1.5,1,0; . . .
  5,2,1.75,1.6,1.3,1,0; 4,2,2,1.5,1,0,0; 5,2,1.75,1.75,1.3,1,0];
 end;
end;
```

Insertion function 810 makes the changes to embed a watermark signal element determined by perceptual adaptation. These can be a combination of changes in multiple domains (e.g., time and frequency). Equivalent changes from one domain can be transformed to another domain, where they are combined and applied to the host signal. An example is where parameters for frequency domain based feature masking are computed in the frequency domain and converted to the time domain for application of additional temporal masking and temporal gain adjustment (e.g., removal of pre-echoes) and insertion of a time domain change.

Iterative embedding control module 812 is processing logic that implements the evaluations that control whether iterative embedding is applied, and if so, with which parameters being updated. This is not applied for low latency or real-time embedding, but may be useful for embedding of pre-recorded content.

Processing of these modules repeats with the next audio block. The same watermark may be repeated (e.g., tiled), may be time multiplexed with other watermarks, and have a mix of redundant and time varying elements.

Watermark Decoding

Figure 6:
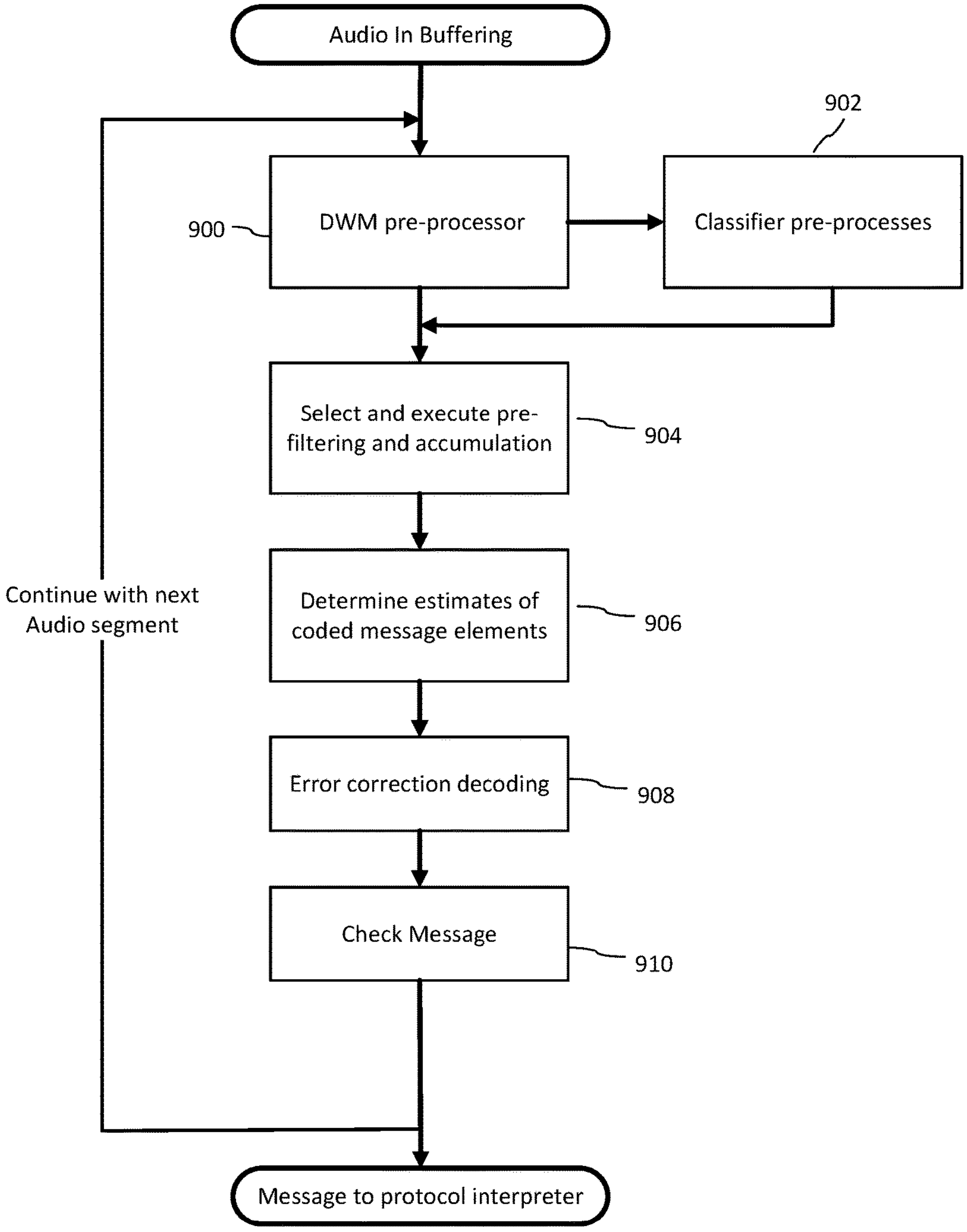
FIG. 6 is a diagram illustrating a process for digital watermark decoding for audio signals.

FIG. 6 is flow diagram illustrating a process for decoding auxiliary data from audio. For more details on implementation of low power decoder embodiments, please see our co-pending application, Methods And System For Cue Detection From Audio Input, Low-Power Data Processing And Related Arrangements, PCT/US14/72397 (and counterpart U.S. application Ser. No. 15/192,925), which are hereby incorporated by reference.

We have used the terms "detect" and "detector" to refer generally to the act and device, respectively, for detecting an embedded watermark in a host signal. The device is either a programmed computer, or special purpose digital logic, or a combination of both. Acts of detecting encompass determining presence of an embedded signal or signals, as well as ascertaining information about that embedded signal, such as its position and time scale (e.g., referred to as "synchronization"), and the auxiliary information that it conveys, such as variable message symbols, fixed symbols, etc. Detecting a watermark signal or a component of a signal that conveys auxiliary information is a method of extracting information conveyed by the watermark signal. The act of watermark decoding also refers to a process of extracting information conveyed in a watermark signal. As such, watermark decoding and detecting are sometimes used interchangeably. In the following discussion, we provide additional detail of various stages of obtaining a watermark from a watermarked host signal.

FIG. 6 illustrates stages of a multi-stage watermark detector. This detector configuration is designed to be sufficiently general and modular so that it can detect different watermark types. There is some initial processing to prepare the audio for detecting these different watermarks, and for efficiently identifying which, if any, watermarks are present. For the sake of illustration, we describe an implementation that detects both time domain and frequency domain watermarks (including peak based and distributed bumps), each having variable protocols. From this general implementation framework, a variety of detector implementations can be made, including ones that are limited in watermark type, and those that support multiple types.

The detector operates on an incoming audio signal, which is digitally sampled and buffered in a memory device. Its basic mode is to apply a set of processing stages to each of several time segments (possibly overlapping by some time delay). The stages are configured to re-use operations and avoid unnecessary processing, where possible (e.g., exit detection where watermark is not initially detected or skip a stage where execution of the stage for a previous segment can be re-used).

As shown in FIG. 6, the detector starts by executing a preprocessor 900 on digital audio data stored in a buffer. The preprocessor samples the audio data to the time resolution used by subsequent stages of the detector. It also spawns execution of initial pre-processing modules 902 to classify the audio and determine watermark type.

This pre-processing has utility independent of any subsequent content identification or recognition step (watermark detecting, fingerprint extraction, etc.) in that it also defines the audio context for various applications. For example, the audio classifier detects audio characteristics associated with a particular environment of the user, such as characteristics indicating a relatively noise free environment, or noisy environments with identifiable noise features, like car noise, or noises typical in public places, city streets, etc. These characteristics are mapped by the classifier to a contextual statement that predicts the environment.

Examples of these pre-processing threads include a classifier to determine audio features that correspond to particular watermark types. Pre-processing for watermark detection and classifying content share common operations, like computing the audio spectrum for overlapping blocks of audio content. Similar analyses as employed in the embedder provide signal characteristics in the time and frequency domains such as signal energy, spectral characteristics, statistical features, tonal properties and harmonics that predict watermark type (e.g., which time or frequency domain watermark arrangement). Even if they do not provide a means to predict watermark type, these pre-processing stages transform the audio blocks to a state for further watermark detection.

As explained in the context of embedding, perceptual modeling and audio classifying processes also share operations. The process of applying an auditory system model to the audio signal extracts its perceptual attributes, which includes its masking parameters. At the detector, a compatible version of the ear model indicates the corresponding attributes of the received signal, which informs the type of watermark applied and/or the features of the signal where watermark signal energy is likely to be greater. The type of watermark may be predicted based on a known mapping between perceptual attributes and watermark type. The perceptual masking model for that watermark type is also predicted. From this prediction, the detector adapts detector operations by weighting attributes expected to have greater signal energy with greater weight.

Audio fingerprint recognition can also be triggered to seek a general classification of audio type or particular identification of the content that can be used to assist in watermark decoding. Fingerprints computed for the frame are matched with a database of reference fingerprints to find a match. The matching entry is linked to data about the audio signal in a metadata database. The detector retrieves pertinent data about the audio segment, such as its audio signal attributes (audio classification), and even particular masking attributes and/or an original version of the audio segment if positive matching can be found, from metadata database. See, for example, U.S. Patent Publication 20100322469 (by Sharma, entitled Combined Watermarking and Fingerprinting).

An alternative to using classifiers to predict watermark type is to use simplified watermark detector to detect the protocol conveyed in a watermark as described previously. Another alternative is to spawn separate watermark detection threads in parallel or in predetermined sequence to detect watermarks of different type. A resource management kernel can be used to limit un-necessary processing, once a watermark protocol is identified.

The subsequent processing modules of the detector shown in FIG. 6 represent functions that are generally present for each watermark type. Of course, certain types of operations need not be included for all applications, or for each configuration of the detector initiated by the pre-processor. For example, simplified versions of the detector processing modules may be used where there are fewer robustness concerns, or to do initial watermark synchronization or protocol identification. Conversely, techniques used to enhance detection by countering distortions in ambient detection (multipath mitigation) and by enhancing synchronization in the presence of time shifts and time scale distortions (e.g., linear and pitch invariant time scaling of the audio after embedding) are included where necessary.

The detector for each watermark type applies one or more pre-filters and signal accumulation functions that are tuned for that watermark type. Both of these operations are designed to improve the watermark signal to noise ratio. Pre-filters emphasize the watermark signal and/or de-emphasize the remainder of the signal. Accumulation takes advantage of redundancy of the watermark signal by combining like watermark signal elements at distinct embedding locations. As the remainder of the signal is not similarly correlated, this accumulation enhances the watermark signal elements while reducing the non-watermark residual signal component. For reverse frame embedding, this form of watermark signal gain is achieved relative to the host signal by taking advantage of the reverse polarity of the watermark signal elements. For example, 20 frames are combined, with the sign of the frames reversing consistent with the reversing polarity of the watermark in adjacent frames. Where frame reversal is applied at different rates on different subbands, the detector sub divides the audio signal into subbands and accumulates and combines audio content according to the frame reversal rate of the subband.

The output of this configuration of filter and accumulator stages provides estimates of the watermark signal elements at corresponding embedding locations, or values from which the watermark signal can be further detected. At this level of detecting, the estimates are determined based on the insertion function for the watermark type. For insertion functions that make bump adjustments, the bump adjustments relative to neighboring signal values or corresponding pairs of bump adjustments (for pairwise protocols) are determined by predicting the bump adjustment (which can be a predictive filter, for example). For peak based structures, pre-filtering enhances the peaks, allowing subsequent stages to detect arrangements of peaks in the filtered output. Pre-filtering can also restrict the contribution of each peak so that spurious peaks do not adversely affect the detection outcome. For quantized feature embedding, the quantization level is determined for features at embedding locations. For echo insertion, the echo property is detected for each echo (e.g., an echo protocol may have multiple echoes inserted at different frequency bands and time locations). In addition, pre-filtering provides normalization to audio dynamic range (volume) changes.

The embedding locations for coded message elements are known based on the mapping specified in the watermark protocol. In the case where the watermark signal communicates the protocol, the detector is programmed to detect the watermark signal component conveying the protocol based on a predetermined watermark structure and mapping of that component. For example, an embedded code signal (e.g., Hadamard code explained previously) is detected that identifies the protocol, or a protocol portion of the extensible watermark payload is decoded quickly to ascertain the protocol encoded in its payload.

Returning to FIG. 6, the next step of the detector is to aggregate estimates of the watermark signal elements. This process is, of course, also dependent on watermark type and mapping. For a watermark structure comprised of peaks, this includes determining and summing the signal energy at expected peak locations in the filtered and accumulated output of the previous stage. For a watermark structure comprised of bumps, this includes aggregating the bump estimates at the bump locations based on a code symbol mapping to embedding locations. In both cases, the estimates of watermark signal elements are aggregated across embedding locations.

In a time domain Direct Sequence Spread Spectrum (DSSS) implementation, this detection process can be implemented as a correlation with the carrier signal (e.g., m-sequences) after the pre-processing stages. The pre-processing stages apply a pre-filtering to an approximately 9 second audio frame and accumulate redundant watermark tiles by averaging the filter output of the tiles within that audio frame. Non-linear filtering (e.g., extended dual axis or differentiation followed by quad axis) produces estimates of bumps at bump locations within an accumulated tile. The output of the filtering and accumulation stage provides estimates of the watermark signal elements at the chip level (e.g., the weighted estimate and polarity of binary antipodal signal elements provides input for soft decision, Viterbi decoding). These chip estimates are aggregated per error correction encoded symbol to give a weighted estimate of that symbol. Robustness to translational shifts is improved by correlating with all cyclical shift states of the m-sequence. For example, if the m-sequence is 31 bits, there are 31 cyclical shifts. For each error correction encoded message element, this provides an estimate of that element (e.g., a weighted estimate).

In the counterpart frequency domain DSSS implementation, the detector likewise aggregates the chips for each error correction encoded message element from the bump locations in the frequency domain. The bumps are in the frequency magnitude, which provides robustness to translation shifts.

Next, for these implementations, the weighted estimates of each error correction coded message element are input to a convolutional decoding process. This decoding process is a Viterbi decoder. It produces error corrected message symbols of the watermark message payload. A portion of the payload carries error detection bits, which are a function of other message payload bits.

To check the validity of the payload, the error detection function is computed from the message payload bits and compared to the error detection bits. If they match, the message is deemed valid. In some implementations, the error detection function is a CRC. Other functions may also serve a similar error detection function, such as a hash of other payload bits.

The processing modules described above may be implemented in hardware. To review an exemplary ASIC design process, a module (e.g., an automated process for generating masking thresholds) is first implemented using a general purpose computer, using software such as Matlab (from Mathworks, Inc.). A tool such as HDLCoder (also available from MathWorks) is next employed to convert the MatLab model to VHDL (an IEEE standard, and doubtless the most common hardware design language). The VHDL output is then applied to a hardware synthesis program, such as Design Compiler by Synopsis, HDL Designer by Mentor Graphics, or Encounter RTL Compiler by Cadence Design Systems. The hardware synthesis program provides output data specifying a particular array of electronic logic gates that will realize the technology in hardware form, as a special-purpose machine dedicated to such purpose. This output data is then provided to a semiconductor fabrication contractor, which uses it to produce the customized silicon part. (Suitable contractors include TSMC, Global Foundries, and ON Semiconductors.)

Essentially all of the modules detailed above can be implemented in such fashion. Tools for designing ASIC circuitry based on C or C++ software description, e.g., so-called "C-to-Silicon" tools, continue to advance. In addition to those named above, such tools are available from Calypto Design Systems and Cadence Design Systems. In addition to providing RTL (Register-Transfer Level) descriptions by which ASIC chips can be fabricated, RTL output can additionally/alternatively be used to configure FPGAs and other such logic. One family of such logic that is particularly suitable to image processing is available from Flex-Logix, e.g., the EFLX-2.5K all-logic FPGA core in TSMC 28 nm High Performance Mobile (HPM) process technology.

Software instructions for implementing identified software-programmed functionality can be authored by artisans without undue experimentation from the descriptions provided herein, e.g., written in C, C++, Visual Basic, Java, Python, Tcl, Perl, Scheme, Ruby, etc., in conjunction with associated data.

Software and hardware configuration data/instructions are commonly stored as instructions in one or more data structures conveyed by tangible media, such as magnetic or optical discs, memory cards, ROM, etc., which may be accessed across a network.

Overview of Electronic Device Architecture

Figure 7:
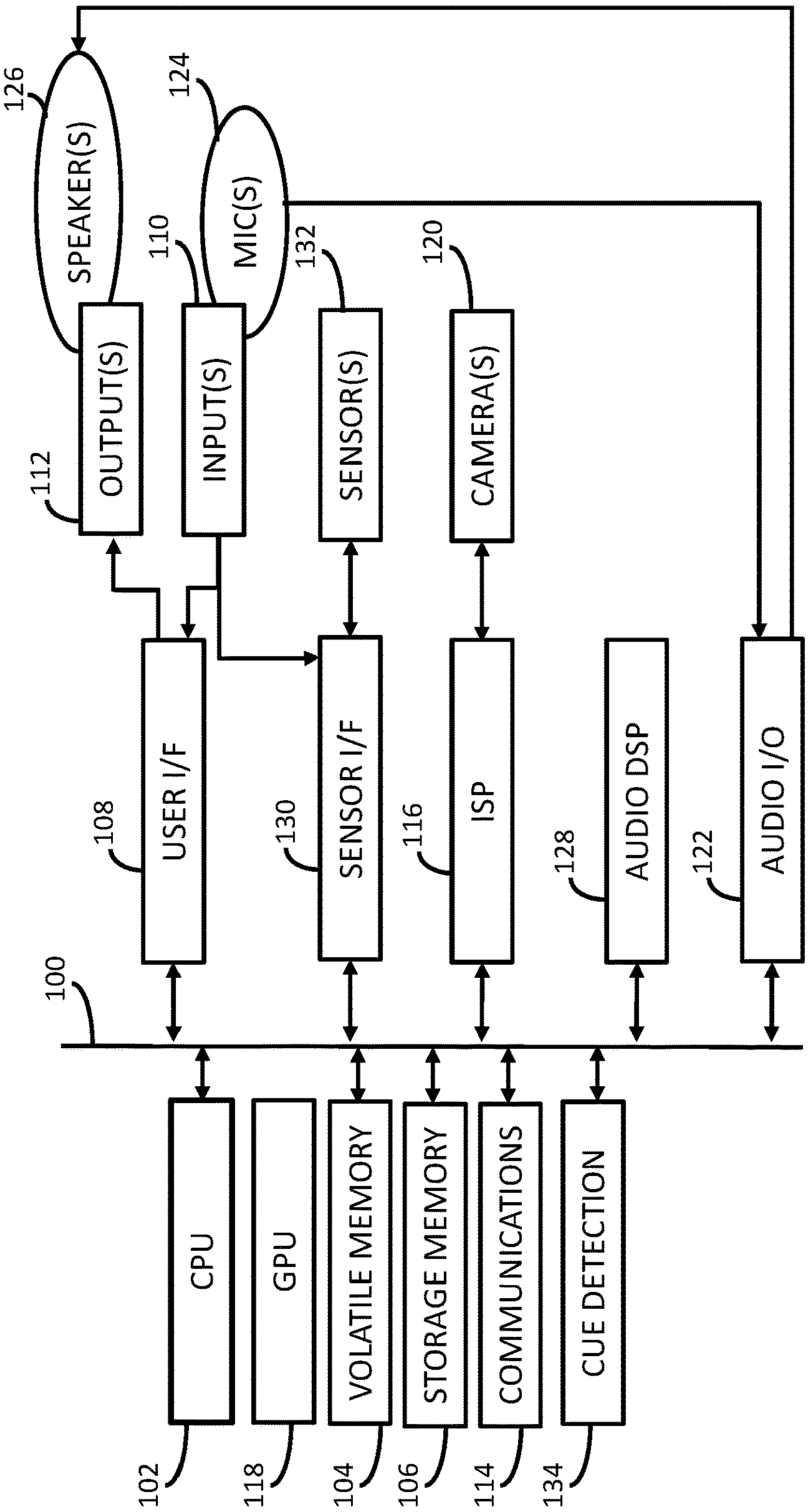
FIG. 7 is a diagram of an electronic device in which embodiments of the technology described in this document may be implemented.

Referring to FIG. 7, a system for an electronic device includes bus 100, to which many devices, modules, etc., (each of which may be generically referred as a “component”) are communicatively coupled. The bus 100 may combine the functionality of a direct memory access (DMA) bus and a programmed input/output (PIO) bus. In other words, the bus 100 may facilitate both DMA transfers and direct CPU read and write instructions. In one embodiment, the bus 100 is one of the Advanced Microcontroller Bus Architecture (AMBA) compliant data buses. Although FIG. 7 illustrates an embodiment in which all components are communicatively coupled to the bus 100, it will be appreciated that one or more sub-sets of the components may be communicatively coupled to a separate bus in any suitable or beneficial manner, and that any component may be communicatively coupled to two or more buses in any suitable or beneficial manner. Although not illustrated, the electronic device can optionally include one or more bus controllers (e.g., a DMA controller, an I2C bus controller, or the like or any combination thereof), through which data can be routed between certain of the components.

The electronic device also includes a CPU 102. The CPU 102 may be any microprocessor, mobile application processor, etc., known in the art (e.g., a Reduced Instruction Set Computer (RISC) from ARM Limited, the Krait CPU product-family, any X86-based microprocessor available from the Intel Corporation including those in the Pentium, Xeon, Itanium, Celeron, Atom, Core i-series product families, etc.). The CPU 102 runs an operating system of the electronic device, runs application programs (e.g., mobile apps such as those available through application distribution platforms such as the Apple App Store, Google Play, etc.) and, optionally, manages the various functions of the electronic device. The CPU 102 may include or be coupled to a read-only memory (ROM) (not shown), which may hold an operating system (e.g., a “high-level” operating system, a “real-time” operating system, a mobile operating system, or the like or any combination thereof) or other device firmware that runs on the electronic device.

The electronic device may also include a volatile memory 104 electrically coupled to bus 100. The volatile memory 104 may include, for example, any type of random access memory (RAM). Although not shown, the electronic device may further include a memory controller that controls the flow of data to and from the volatile memory 104.

The electronic device may also include a storage memory 106 connected to the bus. The storage memory 106 typically includes one or more non-volatile semiconductor memory devices such as ROM, EPROM and EEPROM, NOR or NAND flash memory, or the like or any combination thereof, and may also include any kind of electronic storage device, such as, for example, magnetic or optical disks. In embodiments of the present invention, the storage memory 106 is used to store one or more items of software. Software can include system software, application software, middleware (e.g., Data Distribution Service (DDS) for Real Time Systems, MER, etc.), one or more computer files (e.g., one or more data files, configuration files, library files, archive files, etc.), one or more software components, or the like or any stack or other combination thereof.

Examples of system software include operating systems (e.g., including one or more high-level operating systems, real-time operating systems, mobile operating systems, or the like or any combination thereof), one or more kernels, one or more device drivers, firmware, one or more utility programs (e.g., that help to analyze, configure, optimize, maintain, etc., one or more components of the electronic device), and the like. Application software typically includes any application program that helps users solve problems, perform tasks, render media content, retrieve (or access, present, traverse, query, create, organize, etc.) information or information resources on a network (e.g., the World Wide Web), a web server, a file system, a database, etc. Examples of software components include device drivers, software CODECs, message queues or mailboxes, databases, URLs or other identifiers, and the like. A software component can also include any other data or parameter to be provided to application software, a web application, or the like or any combination thereof. Examples of data files include image files, text files, audio files, video files, haptic signature files, user preference files, contact information files (e.g., containing data relating to phone numbers, email addresses, etc.), calendar files (e.g., containing data relating to appointments, meetings, etc.), location files (e.g., containing data relating to current, saved or pinned addresses, geospatial locations, etc.), web browser files (e.g., containing data relating to bookmarks, browsing history, etc.), and the like.

Also connected to the bus 100 is a user interface module 108. The user interface module 108 is configured to facilitate user control of the electronic device. Thus the user interface module 108 may be communicatively coupled to one or more user input devices 110. A user input device 110 can, for example, include a button, knob, touch screen, trackball, mouse, microphone (e.g., an electret microphone, a MEMS microphone, or the like or any combination thereof), an IR or ultrasound-emitting stylus, an ultrasound emitter (e.g., to detect user gestures, etc.), one or more structured light emitters (e.g., to project structured IR light to detect user gestures, etc.), one or more ultrasonic transducers, or the like or any combination thereof.

The user interface module 108 may also be configured to indicate, to the user, the effect of the user’s control of the electronic device, or any other information related to an operation being performed by the electronic device or function otherwise supported by the electronic device. Thus the user interface module 108 may also be communicatively coupled to one or more user output devices 112. A user output device 112 can, for example, include a display (e.g., a liquid crystal display (LCD), a light emitting diode (LED) display, an active-matrix organic light-emitting diode (AMOLED) display, an e-ink display, etc.), a light, a buzzer, a haptic actuator, a loud speaker, or the like or any combination thereof.

Generally, the user input devices 110 and user output devices 112 are an integral part of the electronic device; however, in alternate embodiments, any user input device 110 (e.g., a microphone, etc.) or user output device 112 (e.g., a loud speaker, haptic actuator, light, display, etc.) may be a physically separate device that is communicatively coupled to the electronic device (e.g., via a communications module 114). Although the user interface module 108 is illustrated as an individual component, it will be appreciated that the user interface module 108 (or portions thereof) may be functionally integrated into one or more other components of the electronic device (e.g., the CPU 102, the sensor interface module 130, etc.).

Also connected to the bus 100 is an image signal processor 116 and a graphics processing unit (GPU) 118. The image signal processor (ISP) 116 is configured to process imagery (including still-frame imagery, video imagery, or the like or any combination thereof) captured by one or more cameras 120, or by any other image sensors, thereby generating image data. General functions typically performed by the ISP 116 can include Bayer transformation, demosaicing, noise reduction, image sharpening, or the like or any combination thereof. The GPU 118 can be configured to process the image data generated by the ISP 116, thereby generating processed image data. General functions typically performed by the GPU 118 include compressing image data (e.g., into a JPEG format, an MPEG format, or the like or any combination thereof), creating lighting effects, rendering 3D graphics, texture mapping, calculating geometric transformations (e.g., rotation, translation, etc.) into different coordinate systems, etc. and send the compressed video data to other components of the electronic device (e.g., the volatile memory 104) via bus 100. The GPU 118 may also be configured to perform one or more video decompression or decoding processes. Image data generated by the ISP 116 or processed image data generated by the GPU 118 may be accessed by the user interface module 108, where it is converted into one or more suitable signals that may be sent to a user output device 112 such as a display.

Also coupled the bus 100 is an audio I/O module 122, which is configured to encode, decode and route data to and from one or more microphone(s) 124 (any of which may be considered a user input device 110) and loud speaker(s) 126 (any of which may be considered a user output device 110). For example, sound can be present within an ambient, aural environment (e.g., as one or more propagating sound waves) surrounding the electronic device. A sample of such ambient sound can be obtained by sensing the propagating sound wave(s) using one or more microphones 124, and the microphone(s) 124 then convert the sensed sound into one or more corresponding analog audio signals (typically, electrical signals), thereby capturing the sensed sound. The signal(s) generated by the microphone(s) 124 can then be processed by the audio I/O module 122 (e.g., to convert the analog audio signals into digital audio signals) and thereafter output the resultant digital audio signals (e.g., to an audio digital signal processor (DSP) such as audio DSP 128, to another module such as a song recognition module, a speech recognition module, a voice recognition module, etc., to the volatile memory 104, the storage memory 106, or the like or any combination thereof). The audio I/O module 122 can also receive digital audio signals from the audio DSP 128, convert each received digital audio signal into one or more corresponding analog audio signals and send the analog audio signals to one or more loudspeakers 126. In one embodiment, the audio I/O module 122 includes two communication channels (e.g., so that the audio I/O module 122 can transmit generated audio data and receive audio data simultaneously).

The audio DSP 128 performs various processing of digital audio signals generated by the audio I/O module 122, such as compression, decompression, equalization, mixing of audio from different sources, etc., and thereafter output the processed digital audio signals (e.g., to the audio I/O module 122, to another module such as a song recognition module, a speech recognition module, a voice recognition module, etc., to the volatile memory 104, the storage memory 106, or the like or any combination thereof). Generally, the audio DSP 128 may include one or more microprocessors, digital signal processors or other microcontrollers, programmable logic devices, or the like or any combination thereof. The audio DSP 128 may also optionally include cache or other local memory device (e.g., volatile memory, non-volatile memory or a combination thereof), DMA channels, one or more input buffers, one or more output buffers, and any other component facilitating the functions it supports (e.g., as described below). In one embodiment, the audio DSP 128 includes a core processor (e.g., an ARM® AudioDE™ processor, a Hexagon processor (e.g., QDSP6V5A)), as well as a data memory, program memory, DMA channels, one or more input buffers, one or more output buffers, etc. Although the audio I/O module 122 and the audio DSP 128 are illustrated as separate components, it will be appreciated that the audio I/O module 122 and the audio DSP 128 can be functionally integrated together. Further, it will be appreciated that the audio DSP 128 and other components such as the user interface module 108 may be (at least partially) functionally integrated together.

The aforementioned communications module 114 includes circuitry, antennas, sensors, and any other suitable or desired technology that facilitates transmitting or receiving data (e.g., within a network) through one or more wired links (e.g., via Ethernet, USB, FireWire, etc.), or one or more wireless links (e.g., configured according to any standard or otherwise desired or suitable wireless protocols or techniques such as Bluetooth, Bluetooth Low Energy, WiFi, WiMAX, GSM, CDMA, EDGE, cellular 3G or LTE, Li-Fi (e.g., for IR- or visible-light communication), sonic or ultrasonic communication, etc.), or the like or any combination thereof. In one embodiment, the communications module 114 may include one or more microprocessors, digital signal processors or other microcontrollers, programmable logic devices, or the like or any combination thereof. Optionally, the communications module 114 includes cache or other local memory device (e.g., volatile memory, non-volatile memory or a combination thereof), DMA channels, one or more input buffers, one or more output buffers, or the like or any combination thereof. In one embodiment, the communications module 114 includes a baseband processor (e.g., that performs signal processing and implements real-time radio transmission operations for the electronic device).

Also connected to the bus 100 is a sensor interface module 130 communicatively coupled to one or more sensors 132. A sensor 132 can, for example, include an accelerometer (e.g., for sensing acceleration, orientation, vibration, etc.), a magnetometer (e.g., for sensing the direction of a magnetic field), a gyroscope (e.g., for tracking rotation or twist), a barometer (e.g., for sensing altitude), a moisture sensor, an ambient light sensor, an IR or UV sensor or other photodetector, a pressure sensor, a temperature sensor, an acoustic vector sensor (e.g., for sensing particle velocity), a galvanic skin response (GSR) sensor, an ultrasonic sensor, a location sensor (e.g., a GPS receiver module, etc.), a gas or other chemical sensor, or the like or any combination thereof. Although separately illustrated in FIG. 1, any camera 120 or microphone 124 can also be considered a sensor 132. Generally, a sensor 132 generates one or more signals (typically, electrical signals) in the presence of some sort of stimulus (e.g., light, sound, moisture, gravitational field, magnetic field, electric field, etc.), in response to a change in applied stimulus, or the like or any combination thereof. In one embodiment, all sensors 132 coupled to the sensor interface module 130 are an integral part of the electronic device; however, in alternate embodiments, one or more of the sensors may be physically separate devices communicatively coupled to the electronic device (e.g., via the communications module 114). To the extent that any sensor 132 can function to sense user input, then such sensor 132 can also be considered a user input device 110.

The sensor interface module 130 is configured to activate, deactivate or otherwise control an operation (e.g., sampling rate, sampling range, etc.) of one or more sensors 132 (e.g., in accordance with instructions stored internally, or externally in volatile memory 104 or storage memory 106, ROM, etc., in accordance with commands issued by one or more components such as the CPU 102, the user interface module 108, the audio DSP 128, the cue detection module 134, or the like or any combination thereof). In one embodiment, sensor interface module 130 can encode, decode, sample, filter or otherwise process signals generated by one or more of the sensors 132. In one example, the sensor interface module 130 can integrate signals generated by multiple sensors 132 and optionally process the integrated signal(s). Signals can be routed from the sensor interface module 130 to one or more of the aforementioned components of the electronic device (e.g., via the bus 100). In another embodiment, however, any signal generated by a sensor 132 can be routed (e.g., to the CPU 102), the before being processed.

Generally, the sensor interface module 130 may include one or more microprocessors, digital signal processors or other microcontrollers, programmable logic devices, or the like or any combination thereof. The sensor interface module 130 may also optionally include cache or other local memory device (e.g., volatile memory, non-volatile memory or a combination thereof), DMA channels, one or more input buffers, one or more output buffers, and any other component facilitating the functions it supports (e.g., as described above). In one embodiment, the sensor interface module 130 may be provided as the "Sensor Core" (Sensors Processor Subsystem (SPS)) from Qualcomm, the "frizz" from Megachips, or the like or any combination thereof. Although the sensor interface module 130 is illustrated as an individual component, it will be appreciated that the sensor interface module 130 (or portions thereof) may be functionally integrated into one or more other components (e.g., the CPU 102, the communications module 114, the audio I/O module 122, the audio DSP 128, the cue detection module 134, or the like or any combination thereof).

Generally, and as will be discussed in greater detail below, the cue detection module 134 is configured to process signal(s) generated by an analog/digital interface (e.g., an audio ADC, not shown), the communications module 114, the audio I/O module 122, the audio DSP 128, the sensor interface module 130, one or more sensors 132 (e.g., one or more microphones 124, etc.), or the like or any combination thereof to discern a cue therefrom, with little or no involvement of the CPU 102. By doing so, the CPU 102 is free to carry out other processing tasks, or to enter a low power state which extends the useful battery life of the electronic device.

The cue detection module 134 may include a microprocessor, digital signal processor or other microcontroller, programmable logic device, or any other processor typically consuming less power than the CPU 102 when in an active or working state. Optionally, the cue detection module 134 includes cache or other local memory device (e.g., volatile memory, non-volatile memory or a combination thereof), DMA channels, one or more input buffers, one or more output buffers, and any other component facilitating the functions it supports. Although the cue detection module 134 is illustrated as an individual component, it will be appreciated that the cue detection module 134 may be functionally integrated into one or more other components (e.g., the CPU 102, the user interface module 108, the audio I/O module 122, the audio DSP 128, the sensor interface module 130, or the like or any combination thereof).

Constructed as exemplarily described above, the electronic device may be configured as a portable electronic device that may be carried by the user (e.g., in the user's hand, pants pocket, purse, backpack, gym bag, etc.), worn by the user, or the like or any combination thereof. For example, the electronic device may be embodied as a cellular or mobile phone, a smartphone (e.g., iPhone, offered by Apple; Galaxy, offered by Samsung; Moto X, offered by Motorola), a tablet computer (e.g., the iPad, offered by Apple; the Nexus product-family, offered by Google; the Galaxy product-family, offered by Samsung), a laptop computer, a media player (e.g., an iPod or iPod Nano, offered by Apple), a personal activity tracking device (e.g., the Force, Flex, Zip or One, all offered by Fitbit; the MotoActv, offered by Motorola; the FuelBand, offered by Nike), a smartwatch (e.g., the SmartWatch 2, offered by Sony; the Gear, offered by Samsung; the Toq, offered by Qualcomm), a head-mounted electronic device (e.g., Glass, offered by Google; the M100 or Wrap 1200DX, all offered by Vuzix), or any other portable or wearable electronic device (e.g., any finger-, wrist-, arm-, leg-, torso-, neck- ear-, head-mountable device, etc., of the like often used for providing a user visual, audible, or tactile notifications regarding incoming email, voicemail, text message, appointments, alerts, etc., for providing a user with the current time-of-day, for providing a user with biofeedback, for tracking or monitoring of a user's physiological function or physical activity, for facilitating hand-free communications via telephone, email, text messaging, etc.), or the like or any combination thereof. Generally, the electronic device is provided as a battery-powered electronic device (e.g., containing a rechargeable or replaceable battery). In addition, or alternatively, the electronic device may be powered by one or more solar cells, fuel cells, thermoelectric generators, or the like or any combination thereof.

Depending on the particular configuration of the electronic device, the electronic device may include more or fewer components than those mentioned above with respect to FIG. 7, and may include one or more additional components such as timing sources (e.g., oscillators, phase-locked loops, etc.), peripherals (e.g., counter-timers, real-time timers, power-on reset generators, etc.), audio-based analog/digital interfaces (e.g., an audio ADC, an audio DAC, etc.), voltage regulators; power management modules (e.g., power management integrated circuits (ICs) of the likes manufactured by FREESCALE SEMICONDUCTOR, DIALOG SEMICONDUCTOR, EXAR, MAXIM INTEGRATED PRODUCTS, LINEAR TECHNOLOGY, RENESAS ELECTRONICS, TEXAS INSTRUMENTS, etc.), direct memory access (DMA) controllers, other dedicated DSP or general purpose DSPs (e.g., capable of executing one or more functions provided by one or more items of system software, application software, middleware, etc.), field programmable gate arrays (FPGAs), coprocessors, or the like or any combination thereof. In addition (or as an alternative) to the components mentioned above, the electronic device may include one or more other components such as a speech or voice recognition module (e.g., as provided by SENSORY INC., WOLFSON MICROELECTRONICS PLC., etc.), a song recognition module (e.g., as those by ACOUSTID, AMAZON, AUDIBLE MAGIC, AUDIOID, AXWAVE, GRACENOTE, MELODIS, MICROSOFT, PREDIXIS, LAST.FM, SHAZAM, SOUNDHOUND, etc.), a visual processing unit (VPU) such as the MYRIAD 1 or MYRIAD 2 provided by MOVIDIUS LTD., or the like or any combination thereof. In one embodiment, the electronic device is provided as an evidence-based state machine, a blackboard-based system, or as otherwise described in aforementioned U.S. Pat. No. 8,762,852 or in any of U.S. Pat. Nos. 8,175,617 and 8,805,110 and U.S. Patent App. Pub. Nos. 2011/

0161076, 2012/0134548 and 2013/0324161, each of which is incorporated herein by reference in its entirety. Any of these additional components may be provided as separate components communicatively coupled to a bus (e.g., bus 100), or may be wholly integrated into another component, or may incorporated in a distributed manner across a plurality of components.

Notwithstanding any specific discussion of the embodiments set forth herein, the term "module" may refer to software, firmware or circuitry configured to perform any of the methods, processes, functions or operations described herein. Software may be embodied as a software package, code, instructions, instruction sets or data recorded on non-transitory computer readable storage mediums. Software instructions for implementing the detailed functionality can be authored by artisans without undue experimentation from the descriptions provided herein, e.g., written in C, C++, Visual Basic, Java, Python, Tcl, Perl, Scheme, Ruby, etc., in conjunction with associated data. Firmware may be embodied as code, instructions or instruction sets or data that are hard-coded (e.g., nonvolatile) in memory devices. As used herein, the term "circuitry" may include, for example, singly or in any combination, hardwired circuitry, programmable circuitry such as computer processors comprising one or more individual instruction processing cores, state machine circuitry, or firmware that stores instructions executed by programmable circuitry.

Any components of the electronic device (or sub-components thereof) may, collectively or individually, be embodied as circuitry that forms part of a larger or distributed system, for example, an IC, a mobile application processor, a system on-chip (SoC) (e.g., such as is available from the Snapdragon product-family offered by Qualcomm), a desktop computer, or any other electronic device or network thereof (e.g., wireless, wired, ad-hoc, Internet, local area network, near-me area network, personal area network, body area network, wireless sensor network, or the like or any combination thereof), or the like or any combination thereof. Moreover, while certain chipset architectures have been explicitly discussed above, it will be appreciated that the discussion is not intended to be limiting and that the embodiments disclosed herein are to be broadly construed to encompass other architectures and many variations thereof.

CONCLUDING REMARKS

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The methods, processes, and systems described above may be implemented in hardware, software or a combination of hardware and software. For example, the signal processing operations for deriving and applying perceptual models may be implemented as instructions stored in a memory and executed in a programmable computer (including both software and firmware instructions), implemented as digital logic circuitry in a special purpose digital circuit, or combination of instructions executed in one or more processors and digital logic circuit modules. The methods and processes described above may be implemented in programs executed from a system's memory (a computer readable medium, such as an electronic, optical or magnetic storage device). The methods, instructions and circuitry operate on electronic signals, or signals in other electromagnetic forms. These signals further represent physical signals like image signals captured in image sensors, audio captured in audio sensors, as well as other physical signal types captured in sensors for that type. These electromagnetic signal representations are transformed to different states as detailed above to detect signal attributes, perform pattern recognition and matching, encode and decode digital data signals, calculate relative attributes of source signals from different sources, etc. The above methods, instructions, and hardware operate on reference and suspect signal components. As signals can be represented as a sum of signal components formed by projecting the signal onto basis functions, the above methods generally apply to a variety of signal types. The Fourier transform, for example, represents a signal as a sum of the signal's projections onto a set of basis functions.

The particular combinations of elements and features in the above-detailed embodiments are exemplary only; the interchanging and substitution of these teachings with other teachings in this and the incorporated-by-reference patents/applications are also contemplated.

We claim:

1. A method for generating and applying a psychoacoustic model from an audio signal comprising:

using a programmed processor, performing the acts of:

transforming a block of samples of an audio signal into a frequency spectrum comprising frequency components;

from the frequency spectrum, deriving group masking energies, the group masking energies each corresponding to a group of neighboring frequency components in the frequency spectrum;

for each of plural groups of neighboring frequency components, allocating the group masking energy to the frequency components in a corresponding group in proportion to energy of the frequency components within the corresponding group to provide adapted mask energies for the frequency components within the corresponding group, the adapted mask energies providing masking thresholds for the psychoacoustic model of the audio signal; and controlling audibility of an audio signal processing operation on the audio signal with the masking thresholds by applying the masking thresholds to control changes in the audio signal of the audio signal processing operation, wherein the changes are configured to encode auxiliary digital data in the audio signal;

the method further including for each of plural groups of neighboring frequency components, determining a variance and a group average of the energies of the frequency components within a group;

in a group where variance exceeds a threshold, comparing the adapted mask energies of frequency components with group average; and for frequency components in the group with adapted mask energy that exceeds the group average, setting the group average as a masking threshold for the frequency component.

2. The method of claim 1 wherein the groups of neighboring frequency components correspond to partitions of the frequency spectrum and group masking energies comprise partition masking thresholds;

the method further comprising:

determining partition energy from the energy of frequency components in a partition;

for each of plural partitions, determining a masking effect of a masker partition on neighboring maskee partitions by applying a spreading function to partition energy of the masker partition; and from the masking effects of plural masker partitions on a maskee partition, determining a combined masking effect on the maskee partition, the combined masking effect providing the group masking energy of the maskee partition.

3. The method of claim 1 wherein deriving group masking energies comprises decimating frequency components within a group of neighboring frequency components and obtaining the group masking energy from one or more frequency components after the decimating.

4. The method of claim 1 wherein the masking thresholds are derived for short audio blocks of the audio signal at a first frequency resolution and interpolated for a long audio block of the audio signal at a second frequency resolution, higher than the first frequency resolution; the method further comprising:

applying interpolated masking thresholds to the auxiliary data signal.

5. The method of claim 1 further comprising pre-conditioning an audio signal for insertion of auxiliary digital data, the preconditioning comprising:

applying the psychoacoustic model to an audio signal to identify a block of audio in which audio signal energy is below a threshold for hiding a digital data signal;

increasing signal energy of the audio signal according to the perceptual model; and adjusting the audio signal to insert the digital data signal according to a threshold of the perceptual model.

6. A non-transitory computer readable medium on which is stored instructions, which when executed by one or more processors, perform a method of:

transforming a block of samples of an audio signal into a frequency spectrum comprising frequency components;

from the frequency spectrum, deriving group masking energies, the group masking energies each corresponding to a group of neighboring frequency components in the frequency spectrum;

for each of plural groups of neighboring frequency components, allocating the group masking energy to the frequency components in a corresponding group in proportion to energy of the frequency components within the corresponding group to provide adapted mask energies for the frequency components within the corresponding group, the adapted mask energies providing masking thresholds for the psychoacoustic model of the audio signal; and controlling audibility of an audio signal processing operation on the audio signal with the masking thresholds by applying the masking thresholds to control changes in the audio signal of the audio signal processing operation, wherein the changes are configured to encode auxiliary digital data in the audio signal;

for each of plural groups of neighboring frequency components, determining a variance and a group average of the energies of the frequency components within a group;

in a group where variance exceeds a threshold, comparing the adapted mask energies of frequency components with group average; and for frequency components in the group with adapted mask energy that exceeds the group average, setting the group average as a masking threshold for the frequency component.

7. The computer readable medium of claim 6 wherein the groups of neighboring frequency components correspond to partitions of the frequency spectrum and group masking energies comprise partition masking thresholds;

the computer readable medium on which is stored instructions, which when executed by the one or more processors, perform a method of:

determining partition energy from the energy of frequency components in a partition;

for each of plural partitions, determining a masking effect of a masker partition on neighboring maskee partitions by applying a spreading function to partition energy of the masker partition; and from the masking effects of plural masker partitions on a maskee partition, determining a combined masking effect on the maskee partition, the combined masking effect providing the group masking energy of the maskee partition.

8. The computer readable medium of claim 6 wherein the masking thresholds are derived for short audio blocks of the audio signal at a first frequency resolution and interpolated for a long audio block of the audio signal at a second frequency resolution, higher than the first frequency resolution;

the computer readable medium on which is stored instructions, which when executed by the one or more processors, apply interpolated masking thresholds to the auxiliary data signal.

9. A electronic device comprising:

an audio sensor;

a memory;

a processor coupled to the memory, the processor configured to execute instructions stored in the memory to:

convert a block of samples of an audio signal obtained from the audio sensor into a frequency spectrum comprising frequency components;

compute group masking energies from the frequency spectrum, the group masking energies each corresponding to a group of neighboring frequency components in the frequency spectrum;

allocate the group masking energy to the frequency components in a corresponding group in proportion to energy of the frequency components within the corresponding group to provide adapted mask energies for the frequency components within the corresponding group, the adapted mask energies providing masking thresholds for the psychoacoustic model of the audio signal;

determine a variance and a group average of the energies of the frequency components within a group, for each of plural groups of neighboring frequency components;

compare the adapted mask energies of frequency components with group average, in a group where variance exceeds a threshold;

set the group average as a masking threshold for a frequency component with adapted mask energy that exceeds the group average;

and control audibility of an audio signal processing operation on the audio signal with the masking thresholds by applying the masking thresholds to control changes in the audio signal of the audio signal processing operation, wherein the changes are configured to encode auxiliary digital data in the audio signal.

10. A method for generating and applying a psychoacoustic model from an audio signal comprising:

using a programmed processor, performing the acts of:

transforming a block of samples of an audio signal into a frequency spectrum comprising frequency components;

from the frequency spectrum, deriving group masking energies, the group masking energies each corresponding to a group of neighboring frequency components in the frequency spectrum;

for each of plural groups of neighboring frequency components, allocating the group masking energy to the frequency components in a corresponding group in proportion to energy of the frequency components within the corresponding group to provide adapted mask energies for the frequency components within the corresponding group, the adapted mask energies providing masking thresholds for the psychoacoustic model of the audio signal; and controlling audibility of an audio signal processing operation on the audio signal with the masking thresholds by applying the masking thresholds to control changes in the audio signal of the audio signal processing operation;

the method further comprising saturation handling for audio watermarking of an audio signal, the saturation handling comprising:

applying the psychoacoustic model to an audio signal to produce thresholds for inserting a digital data signal;

adapting a digital data signal according to the thresholds;

identifying a location within the audio signal where insertion of the digital data signal exceeds a clipping limit; and applying a clipping function to smooth a change made to insert the digital data signal around the location.

11. The method of claim 10 wherein the clipping function comprises a window function.

12. The method of claim 11 wherein the window function comprise a Gaussian shaped window function.

* * * * *